US010598562B2

United States Patent

(12) United States Patent
Steele et al.
(10) Patent No.: US 10,598,562 B2
(45) Date of Patent: Mar. 24, 2020

(54) GAS DETECTION SYSTEMS AND METHODS USING MEASUREMENT POSITION UNCERTAINTY REPRESENTATIONS

(71) Applicant: Picarro Inc., Santa Clara, CA (US)

(72) Inventors: David Steele, San Francisco, CA (US); Chris W. Rella, Sunnyvale, CA (US); Sze M. Tan, Santa Clara, CA (US); Aaron Van Pelt, Hayward, CA (US)

(73) Assignee: Picarro Inc., Santa Clara, CA (US)

( * ) Notice: Subject to any disclaimer, the term of this patent is extended or adjusted under 35 U.S.C. 154(b) by 1159 days.

(21) Appl. No.: 14/948,287

(22) Filed: Nov. 21, 2015

(65) Prior Publication Data

US 2016/0146696 A1 May 26, 2016

Related U.S. Application Data

(60) Provisional application No. 62/083,084, filed on Nov. 21, 2014.

(51) Int. Cl.
*G01M 3/22* (2006.01)
*G01P 13/02* (2006.01)
(Continued)

(52) U.S. Cl.
CPC ................ *G01M 3/22* (2013.01); *F17D 5/02* (2013.01); *G01C 21/3694* (2013.01);
(Continued)

(58) Field of Classification Search
CPC ... G01P 13/02; G01P 5/02; F17D 5/02; G01C 21/3694; G01C 21/3697; G01M 3/04; G01M 3/22
See application file for complete search history.

(56) References Cited

U.S. PATENT DOCUMENTS 4,690,689 A 9/1987 Malcosky et al.
5,191,341 A 3/1993 Gouard et al.
(Continued)

FOREIGN PATENT DOCUMENTS

CA 2339865 A1 7/2002
JP 61155932 A 7/1986
(Continued)

OTHER PUBLICATIONS

MathisFun.com, mathisfun—Definition of Tangent (line), p. 1 (Year: 2007).*

(Continued)

*Primary Examiner* — Sujoy K Kundu
*Assistant Examiner* — L. Anderson
(74) *Attorney, Agent, or Firm* — Law Office of Andrei D Popovici, PC

(57) ABSTRACT

In some embodiments, a natural gas leak detection system generates display content including indicators of remote and local potential leak source areas situated on a map of an area of a gas concentration measurement survey performed by a vehicle-borne device. The remote area may be shaped as a wedge extending upwind from an associated gas concentration measurement point. The local area graphically represents a potential local leak source area situated around the gas concentration measurement point, and having a boundary within a predetermined distance (e.g. 10 meters) of the gas concentration measurement point. The local area may be represented as a circle, ellipse, or other shape, and may include an area downwind from the measurement point. Size and/or shape parameters of the local area indicator may be determined according to survey vehicle speed and direction data, and/or wind speed and direction data characterizing the measurement point.

27 Claims, 22 Drawing Sheets

Surveyor User Interface

Picarro Surveyor for Natural Gas Leaks

Survey Mode

Stop Survey

Start Capture

Analyzer Controls

(51) Int. Cl.

| | |
|---|---|
| ***G01P 5/02*** | (2006.01) |
| ***F17D 5/02*** | (2006.01) |
| ***G01M 3/04*** | (2006.01) |
| ***G01C 21/36*** | (2006.01) |

(52) U.S. Cl.

CPC .......... *G01C 21/3697* (2013.01); *G01M 3/04* (2013.01); *G01P 5/02* (2013.01); *G01P 13/02* (2013.01)

(56) References Cited

U.S. PATENT DOCUMENTS

| | | | |
|---|---|---|---|
| 5,272,646 | A | 12/1993 | Farmer |
| 5,297,421 | A | 3/1994 | Hosonurna et al. |
| 5,390,530 | A | 2/1995 | Hosonuma et al. |
| 5,832,411 | A | 11/1998 | Schatzmann et al. |
| 5,946,095 | A | 8/1999 | Henningsen et al. |
| 6,282,943 | B1 | 9/2001 | Sanders et al. |
| 6,518,562 | B1 | 2/2003 | Cooper et al. |
| 6,532,801 | B1 | 3/2003 | Shan et al. |
| 6,664,533 | B1 | 12/2003 | van der Laan et al. |
| 6,815,687 | B1 | 11/2004 | Branch-Sullivan et al. |
| 6,822,742 | B1 | 11/2004 | Kalayeh et al. |
| 6,995,846 | B2 | 2/2006 | Kalayeh et al. |
| 7,075,653 | B1 | 7/2006 | Rutheford |
| 7,260,507 | B2 | 8/2007 | Kalayeh |
| 7,352,463 | B2 | 4/2008 | Bounaix |
| 7,486,399 | B1 | 2/2009 | Reichardt et al. |
| 7,602,277 | B1 | 10/2009 | Daly et al. |
| 7,730,776 | B2 | 6/2010 | Cornett et al. |
| 7,934,412 | B2 | 5/2011 | Prince |
| 8,000,936 | B2 | 8/2011 | Davis |
| 8,081,112 | B2 | 12/2011 | Tucker et al. |
| 8,200,737 | B2 | 6/2012 | Tarabzouni et al. |
| 9,322,735 | B1 | 4/2016 | Tan et al. |
| 9,557,240 | B1 | 1/2017 | Tan et al. |
| 9,599,529 | B1 | 3/2017 | Steele et al. |
| 9,599,597 | B1 | 3/2017 | Steele et al. |
| 9,645,039 | B1 | 5/2017 | Tan et al. |
| 9,719,879 | B1 | 8/2017 | Tan et al. |
| 9,823,231 | B1 | 11/2017 | Steele et al. |
| 2004/0012491 | A1 | 1/2004 | Kulesz et al. |
| 2004/0263852 | A1 | 12/2004 | Degtiarev et al. |
| 2005/0038825 | A1 | 2/2005 | Tarabzouni et al. |
| 2006/0162428 | A1 | 7/2006 | Hu et al. |
| 2006/0203248 | A1 | 9/2006 | Reichardt |
| 2008/0033693 | A1 | 2/2008 | Andenna et al. |
| 2008/0092061 | A1 | 4/2008 | Bankston et al. |
| 2008/0127726 | A1 | 6/2008 | Elkins |
| 2008/0168826 | A1 | 7/2008 | Saidi et al. |
| 2008/0225273 | A1 | 9/2008 | Ershov |
| 2010/0088031 | A1 | 4/2010 | Nielsen et al. |
| 2010/0091267 | A1 | 4/2010 | Wong |
| 2010/0268480 | A1 | 10/2010 | Prince |
| 2011/0109464 | A1 | 5/2011 | Lepley et al. |
| 2011/0119040 | A1 | 5/2011 | McLennan |
| 2011/0161885 | A1 | 6/2011 | Gonia et al. |
| 2011/0213554 | A1 | 9/2011 | Archibald et al. |
| 2011/0249122 | A1 | 10/2011 | Tricoukes et al. |
| 2011/0251800 | A1 | 10/2011 | Wilkins |
| 2012/0019380 | A1 | 1/2012 | Nielsen et al. |
| 2012/0050143 | A1 | 3/2012 | Border et al. |
| 2012/0072189 | A1 | 3/2012 | Bullen et al. |
| 2012/0092649 | A1* | 4/2012 | Wong .................... G01W 1/00 356/72 |
| 2012/0113285 | A1 | 5/2012 | Baker et al. |
| 2012/0191349 | A1 | 7/2012 | Lenz et al. |
| 2012/0194541 | A1 | 8/2012 | Kim et al. |
| 2012/0194549 | A1 | 8/2012 | Osterhout et al. |
| 2012/0204781 | A1 | 8/2012 | Chun et al. |
| 2012/0232915 | A1 | 9/2012 | Bromberger |
| 2013/0113939 | A1 | 5/2013 | Strandemar |
| 2013/0179078 | A1 | 7/2013 | Griffon |
| 2014/0032160 | A1 | 1/2014 | Rella et al. |

FOREIGN PATENT DOCUMENTS

| | | |
|---|---|---|
| JP | H07120344 | 5/1995 |
| JP | 2006118981 | 5/2006 |

OTHER PUBLICATIONS

USPTO, Office Action dated Mar. 8, 2017 for U.S. Appl. No. 14/319,236, filed Jun. 30, 2014.

USPTO, Office Action dated Nov. 16, 2017 for U.S. Appl. No. 15/418,367, filed Jan. 27, 2017.

USPTO, Office Action dated Jan. 2, 2018 for U.S. Appl. No. 15/137,550, filed Apr. 25, 2016.

Tan, U.S. Appl. No. 15/137,550, filed Apr. 25, 2016.

Tan, U.S. Appl. No. 15/418,367, filed Jan. 27, 2017.

Monster et al., "Measurements of Methane Emissions from Landfills Using Mobile Plume Method with Trace Gas and Cavity Ring-down Spectroscopy", Geophysical Research Abstracts, EGU General Assembly, Vienna, Austria, Apr. 2012.

USPTO, Office Action dated Jun. 4, 2018 for U.S. Appl. No. 15/418,367, filed Jan. 27, 2017.

USPTO, Office Action dated Jul. 31, 2018 for U.S. Appl. No. 15/137,550, filed Apr. 25, 2016.

USPTO, Office Action dated Jun. 4, 2018 for U.S. Appl. No. 15/462,533, filed Mar. 17, 2017.

Keats, Andrew, "Bayesian inference for source determination in the atmospheric environment," University of Waterloo, Waterloo, Ontario, Canada, 2009, the year of the publication is sufficiently earlier than the effective U.S. filing date and any foreign priority date so that the particular month of publication is not in issue.

Prasad Kuldeep R., "Quantification of Methane Emissions From Street Level Data,", http://www.nist.gov/manuscript-publication-search.cfm?pub_id=914433, Abstract #A53E-0213, American Geophysical Union (AGU), Fall Meeting, San Francisco, CA, US, Dec. 9-13, 2013.

Arata C. et al., "Fugitive Methane Source Detection and Discrimination with the Picarro Mobile Methane Investigator," http://adsabs.harvard.edu/abs/2013AGUFM.A53A0150A, Abstract #A53A-0150, American Geophysical Jnion (AGU), Fall Meeting, San Francisco, CA, US, Dec. 9-13, 2013.

Keats, Andrew et al., "Bayesian inference for source determination with applications to a complex urban environment," http://www.sciencedirect.com/science/article/pii/S1352231006008703, Atmospheric Environment 41.3, pp. 465-479, The Netherlands, Jan. 2007.

Pavlin G. et al., "Gas Detection and Source Localization: A Bayesian Approach," http://isif.org/fusion/proceedings/Fusion_2011/data/papers/054.pdf, 14th International Conference on Information Fusion, Chicago, Illinois, US, Jul. 2011.

Crosson E. et al., "Quantification of Methane Source Locations and Emissions in an Urban Setting," http://www.slideserve.com/marly/quantification-of-methane-source-locations-and-emissions-in-an-urban-setting, uploaded on Jul. 31, 2014.

Crosson E. et al., "Quantification of Methane Source Locations and Emissions in an Urban Setting," http://adsabs.harvard.edu/abs/2011AGUFM.B51Q..04C, American Geophysical Union (AGU), Fall Meeting, San Francisco, CA, US, Dec. 5-9, 2011.

Gas Trak Ltd., "Specializing in: Leak Detection Services for: Natural Gas Pipelines," http://www.slideserve.com/yama/specializing-in-leak-detection-services-for-natural-gas-pipelines, uploaded on Jul. 28, 2013.

European Patent Office (ISA), International Search Report and Written Opinion for International Application No. PCT/US2015/062038, international filing date Nov. 21, 2015.

EDF, "Methodology: How the data was collected", Environmental Defense Fund, http://web.archive.org/web/20141019130933/http://www.edf.org/climate/methanemaps/methodology, Washington, DC, USA, Oct. 2014.

Redding, Steve, "Road Map to . . . Redefining the Leak Management Process", https://www3.epa.gov/gasstar/documents/workshops/2014_AIW/Advances_Leak_Detection.pdf, May 2014.

(56) References Cited

OTHER PUBLICATIONS

EDF, "Boston: Snapshot of natural gas leaks", Environmental Defense Fund, https://web.archive.org/web/20141018170749/http://www.edf.org/climate/methanemaps/city-snapshots/boston, Boston, MA, USA, Oct. 2014.
USPTO, Office Action dated Sep. 22, 2016 for U.S. Appl. No. 13/733,861, filed Jan. 3, 2013.
USPTO, Office Action dated Aug. 25, 2016 for U.S. Appl. No. 13/733,864, filed Jan. 3, 2013.
USPTO, Office Action dated Jul. 1, 2016 for U.S. Appl. No. 14/139,388, filed Dec. 23, 2013.
USPTO, Office Action dated Jun. 28, 2016 for U.S. Appl. No. 14/139,348, filed Dec. 23, 2013.
Steele, U.S. Appl. No. 15/462,533, filed Mar. 17, 2017.
USPTO, Office Action dated Sep. 28, 2017 for U.S. Appl. No. 15/462,533, filed Mar. 17, 2017.
Rella, U.S. Appl. No. 13/656,080, filed Oct. 19, 2012.
Rella, U.S. Appl. No. 13/656,096, filed Oct. 19, 2012.
Rella, U.S. Appl. No. 13/656,123, filed Oct. 19, 2012.
Tan, U.S. Appl. No. 13/733,868, filed Jan. 3, 2013.
Tan, U.S. Appl. No. 13/733,861, filed Jan. 3, 2013.
Tan, U.S. Appl. No. 13/733,864, filed Jan. 3, 2013.
Tan, U.S. Appl. No. 13/733,857, filed Jan. 3, 2013.
Rella, U.S. Appl. No. 13/913,357, filed Jun. 7, 2013.
Rella, U.S. Appl. No. 13/913,359, filed Jun. 7, 2013.
USPTO, Office Action dated Jun. 26, 2015 for U.S. Appl. No. 13/733,868, filed Jan. 3, 2013.
USPTO, Office Action dated Aug. 28, 2015 for U.S. Appl. No. 13/733,857, filed Jan. 3, 2013.
USPTO, Office Action dated Nov. 5, 2015 for U.S. Appl. No. 13/733,864, filed Jan. 3, 2013.
USPTO, Office Action dated Nov. 20, 2015 for U.S. Appl. No. 13/733,861, filed Jan. 3, 2013.
USPTO, Office Action dated May 28, 2015 for U.S. Appl. No. 13/913,357, filed Jun. 7, 2013.
USPTO, Office Action dated May 28, 2015 for U.S. Appl. No. 13/913,359, filed Jun. 7, 2013.
Gifford, Frank, "Statistical Properties of a Fluctuating Plume Dispersion Model," p. 117-137, U.S. Weather Bureau Office, Oak Ridge, Tennessee. 1959; the year of publication is sufficiently earlier than the effective U.S. filing date and any foreign priority date so that the particular month of publication is not in issue.
Turner, Bruce, "Workbook of Atmospheric Dispersion Estimates," p. 1-92. U.S. Environmental Protection Agency, Office of Air Programs. North Carolina, US. Jul. 1971.
EPA, "User's Guide for the Industrial Source Complex (ISC3) Dispersion Models, vol. II—Description of Model Algorithms." p. 1-128. U.S. Environmental Protection Agency. North Carolina, US. Sep. 1995.
Wainner et al., High Altitude Natural Gas Leak Detection System, DOE Program Final Report, DOC National Energy Technology Laboratory, Apr. 2007.
Carlbom et al., "Planar Geometric Projections and Viewing Transformations," Computing Surveys, vol. 10: 4, p. 465-502, ACM, New York, NY, Dec. 1978.
Lenz et al., "Flight Testing of an Advanced Airborne Natural Gas Leak Detection System," Final Report, ITT Industries Space Systems LLC, Rochester, NY, Oct. 2005.
Schall et al., "Handheld Augmented Reality for underground infrastructure visualization," Personal and Ubiquitous Computing, V. 13, London, UK, May 2009.
De Nevers, Noel, "Air Pollution Control Engineering," p. 135-137, Waveland Press, Inc., Long Grove, IL, USA, 2010; the year of publication is sufficiently earlier than the effective U.S. filing date and any foreign priority date so that he particular month of publication is not in issue.
Yee et al., "Bayesian inversion of concentration data: Source reconstruction in the adjoint representation of atmospheric diffusion," 4th International Symposium on Computational Wind Engineering, Journal of Wind Engineering and Industrial Aerodynamics, vol. 96, Issues 10-11, pp. 1805-1816, Elsevier Ltd., Netherlands, Oct. 2008.
Humphries et al., "Atmospheric Tomography: A Bayesian Inversion Technique for Determining the Rate and Location of Fugitive Emissions," Environmental Science and Technology, 46, 3, pp. 1739-1746, Berkeley, CA, USA, Dec. 12, 2011.
Rao, Shankar K., "Source estimation methods for atmospheric dispersion," Atmospheric Environment, vol. 41, Issue 33, pp. 6964-6973, Elsevier Ltd., Netherlands, Oct. 2007.
USPTO, Office Action dated Dec. 12, 16, 2016 for U.S. Appl. No. 13/913,357, filed Jun. 7, 2011.
USPTO, Office Action dated Jun. 16, 2017 for U.S. Appl. No. 13/913,359, filed Jun. 7, 2013.
USPTO, Office Action dated Oct. 11, 2018 for U.S. Appl. No. 15/144,751, filed May 2, 2016.
USPTO, Office Action dated Apr. 20, 2016 for U.S. Appl. No. 13/733,857, filed Jan. 3, 2013.
USPTO, Office Action dated Mar. 10, 2016 for U.S. Appl. No. 13/913,357, filed Jun. 7, 2013.
USPTO, Office Action dated Mar. 9, 2016 for U.S. Appl. No. 13/913,359, filed Jun. 7, 2013.
Steele, U.S. Appl. No. 15/144,751, filed May 2, 2016.

* cited by examiner

| Surface wind speed at 10 m (m/s) | Day | | | Night | |
|---|---|---|---|---|---|
| | Incoming Solar radiation | | | Cloud Cover | |
| | Strong | Moderate | Slight | Thinly Overcast (>1/2 cloudy) | Mostly Cloudy |
| < 2 | A | A-B | B | | |
| 2-3 | A-B | B | C | E | F |
| 3-5 | B | B-C | C | D | E |
| 5-6 | C | C-D | D | D | D |
| >6 | C | D | D | D | D |

FIG. 18

| u | 1/u | $\Delta\sigma/\Delta v$ | $ac = u\,\Delta\sigma/\Delta v$ |
|---|---|---|---|
| 0.5 | 2 | 4/3 | 2/3 |
| 1.0 | 1 | 2/3 | 2/3 |
| 2.0 | 0.5 | 1/3 | 2/3 |

GAS DETECTION SYSTEMS AND METHODS USING MEASUREMENT POSITION UNCERTAINTY REPRESENTATIONS

RELATED APPLICATION DATA

This application claims the benefit of the filing date of U.S. provisional patent application No. 62/083,084, filed on Nov. 21, 2014, entitled "Gas Detection Systems and Methods Using Wind and Vehicle Speed Measurements," the entire contents of which are incorporated by reference herein.

BACKGROUND

The invention relates to systems and methods for detecting gas leaks such as methane gas leaks.

A common means of distributing energy around the world is by the transmission of gas, usually natural gas. In some areas of the world manufactured gasses are also transmitted for use in homes and factories. Gas is typically transmitted through underground pipelines having branches that extend into homes and other buildings for use in providing energy for space and water heating. Many thousands of miles of gas pipeline exist in virtually every major populated area. Since gas is highly combustible, gas leakage is a serious safety concern. Recently, there have been reports of serious fires or explosions caused by leakage of gas in the United States as the pipeline infrastructure becomes older. For this reason, much effort has been made to provide instrumentation for detecting small amounts of gas so that leaks can be located to permit repairs.

Conventionally, search teams are equipped with gas detectors to locate a gas leak in the immediate proximity of the detector. When the plume of gas from a leak is detected, the engineers may walk to scan the area slowly and in all directions by trial and error to find the source of the gas leak. This process may be further complicated by wind that quickly disperses the gas plume. Such a search method is time consuming and often unreliable, because the engineer walks around with little or no guidance while trying to find the source of the gas leak.

Another approach to gas leak detection is to mount a gas leak detection instrument on a moving vehicle, e.g., as considered in U.S. Pat. No. 5,946,095. A natural gas detector apparatus is mounted to the vehicle so that the vehicle transports the detector apparatus over an area of interest at speeds of up to 20 miles per hour. The apparatus is arranged such that natural gas intercepts a beam path and absorbs representative wavelengths of a light beam. A receiver section receives a portion of the light beam onto an electro-optical etalon for detecting the gas. Although a moving vehicle may cover more ground than a surveyor on foot, there is still the problem of locating the gas leak source (e.g., a broken pipe) if a plume of gas is detected from the vehicle. Thus, there is still a need to provide a method and apparatus to locate the source of a gas leak quickly and reliably.

SUMMARY

According to one aspect, a natural gas leak detection system comprises at least one hardware processor and associated memory configured to generate display content according to gas concentration and associated wind direction and wind magnitude data characterizing a gas concentration measurement run performed by a mobile gas concentration measurement device; and a display device coupled to the at least one hardware processor and associated memory, the display device configured to present the display content. The display content comprises at least one angular search area indicator situated on a street map, and a local potential leak source area indicator situated on the map. The search area indicator has an axis indicating a representative wind direction relative to a geo-referenced location of at least one gas concentration measurement point. The search area indicator also has a width relative to the axis, wherein the width is indicative of a wind direction variability associated with a plurality of wind direction measurements in an area of the gas concentration measurement point. The local potential leak source area indicator is situated on the map. The local potential leak source area indicator graphically represents a potential local leak source area situated around the gas concentration measurement point and having a boundary within 10 meters of the gas concentration measurement point.

According to another aspect, a non-transitory computer-readable medium encodes instructions which, when executed by at least one hardware processor and associated memory, cause the at least one hardware processor and associated memory to generate display content for presentation on a display device, the display content being generated according to gas concentration and associated wind direction and wind magnitude data characterizing a gas concentration measurement run performed by a mobile gas concentration measurement device. The display content comprises at least one angular search area indicator situated on a street map, and a local potential leak source area indicator situated on the map. The search area indicator indicates a search area suspected to have a natural gas leak source, the search area indicator having an axis indicating a representative wind direction relative to a geo-referenced location of at least one gas concentration measurement point, and the search area indicator having a width relative to the axis, wherein the width is indicative of a wind direction variability associated with a plurality of wind direction measurements in an area of the gas concentration measurement point. The local potential leak source area indicator is situated on the map. The local potential leak source area indicator graphically represents a potential local leak source area situated around the gas concentration measurement point and having a boundary within 10 meters of the gas concentration measurement point.

BRIEF DESCRIPTION OF THE DRAWINGS

The foregoing aspects and advantages of the present invention will become better understood upon reading the following detailed description and upon reference to the drawings where:

FIG. 18 is a table of dispersion coefficients for various atmospheric conditions according to some embodiments of the present invention.

DETAILED DESCRIPTION

Apparatus and methods described herein may include or employ one or more interconnected computer systems such as servers, personal computers and/or mobile communication devices, each comprising one or more processors and associated memory, storage, input and display devices. Such computer systems may run software implementing methods described herein when executed on hardware. In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Computer readable media encompass storage (non-transitory) media such as magnetic, optic, and semiconductor media (e.g. hard drives, optical disks, flash memory, DRAM), as well as communications links such as conductive cables and fiber optic links. According to some embodiments, the present invention provides, inter alia, computer systems programmed to perform the methods described herein, as well as computer-readable media encoding instructions to perform the methods described herein.

Figure 1:
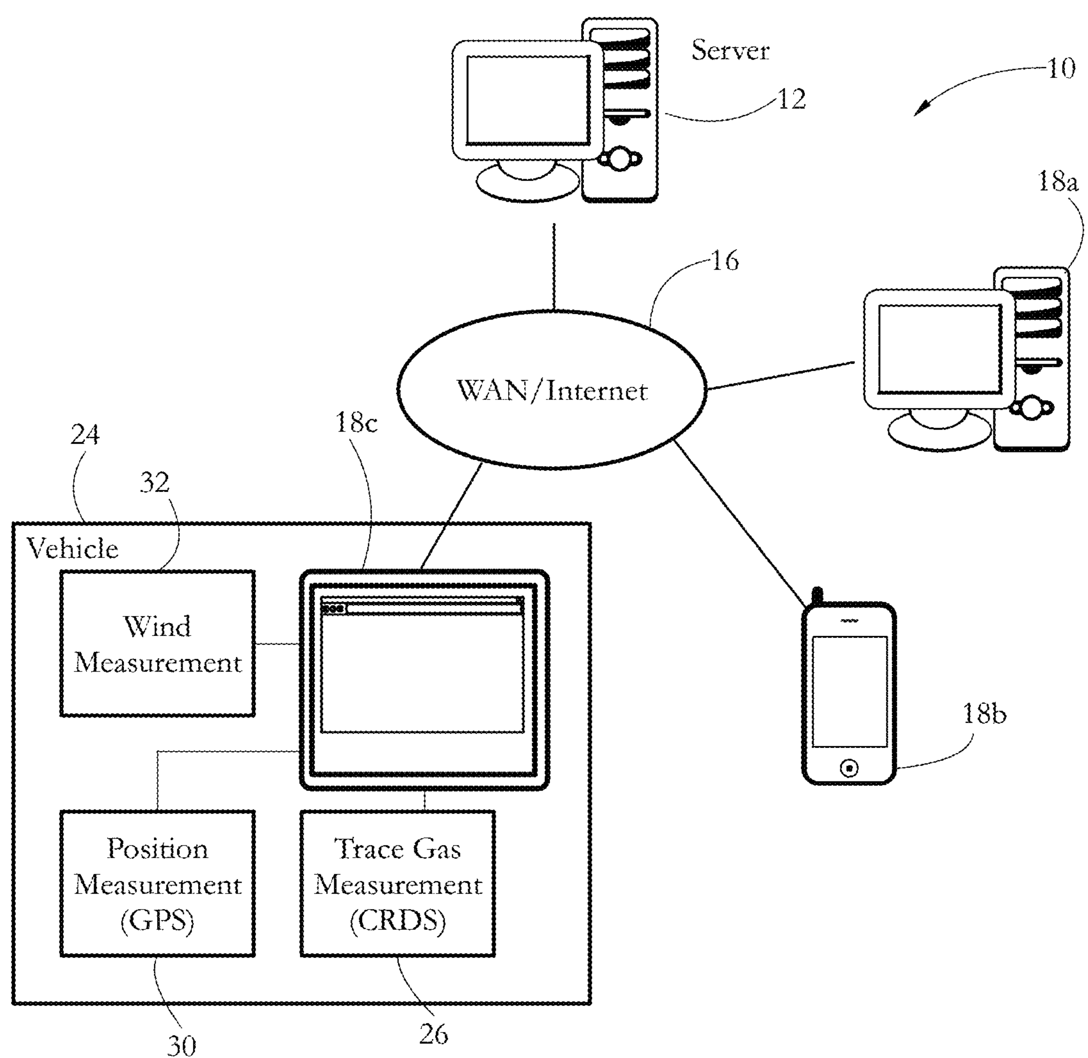
FIG. 1 shows a gas leak detection apparatus according to some embodiments of the present invention.

FIG. 1 shows a gas leak detection system 10 according to some embodiments of the present invention. System 10 comprises a service provider server computer system 12 and a set of client computer systems 18*a-c* all connected through a wide area network 16 such as the Internet. Client computer systems 18*a-c* may be personal computers, laptops, smartphones, tablet computers and the like. A vehicle 24 such as an automobile may be used to carry at least some client computer systems (e.g. an exemplary client computer system 18*c*) and associated hardware including a mobile gas measurement device 26, a location/GPS measurement device 30, and a wind measurement device 32. In a preferred embodiment, the mobile gas measurement device 26 may be a Picarro analyzer using Wavelength-Scanned Cavity Ring Down Spectroscopy (CRDS), available from Picarro, Inc., Santa Clara, Calif. Such analyzers may be capable of detecting trace amounts of gases such as methane, acetylene, carbon monoxide, carbon dioxide, hydrogen sulfide, and/or water. In particular applications suited for detection of natural gas leaks, a Picarro G2203 analyzer capable of detecting methane concentration variations of 3 ppb may be used. Wind measurement device 32 may include a wind anemometer and a wind direction detector (e.g. wind vane). GPS measurement device 30 may be a stand-alone device or a device built into client computer system 18*c*.

Figure 2:
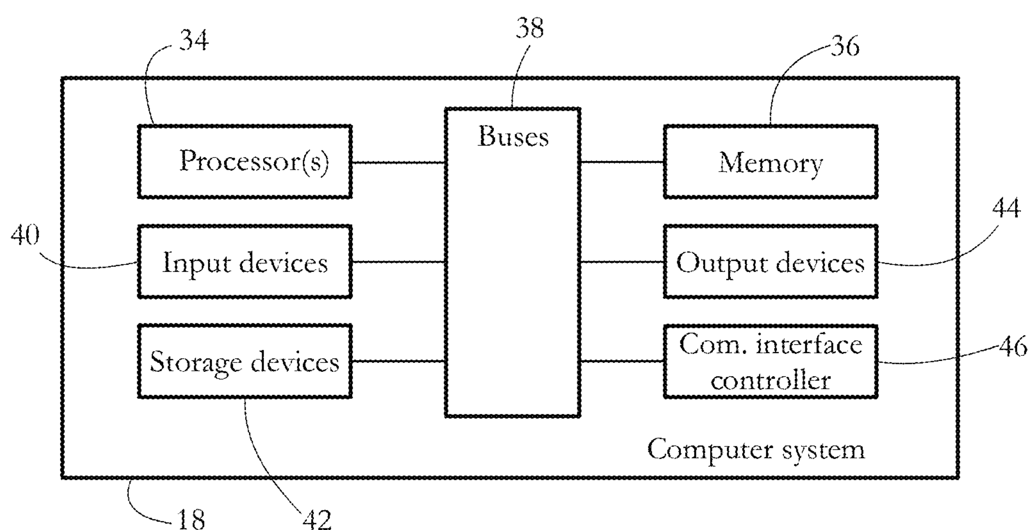
FIG. 2 illustrates hardware components of a computer system according to some embodiments of the present invention.

FIG. 2 schematically illustrates a plurality of hardware components that each computer system 18 may include. Such computer systems may be devices capable of web browsing and have access to remotely-hosted protected websites, such as desktop, laptop, tablet computer devices, or mobile phones such as smartphones. In some embodiments, computer system 18 comprises one or more processors 34, a memory unit 36, a set of input devices 40, a set of output devices 44, a set of storage devices 42, and a communication interface controller 46, all connected by a set of buses 38. In some embodiments, processor 34 comprises a physical device, such as a multi-core integrated circuit, configured to execute computational and/or logical operations with a set of signals and/or data. In some embodiments, such logical operations are delivered to processor 34 in the form of a sequence of processor instructions (e.g. machine code or other type of software). Memory unit 36 may comprise random-access memory (RAM) storing instructions and operands accessed and/or generated by processor 34. Input devices 40 may include touch-sensitive interfaces, computer keyboards and mice, among others, allowing a user to introduce data and/or instructions into system 18. Output devices 44 may include display devices such as monitors. In some embodiments, input devices 40 and output devices 44 may share a common piece of hardware, as in the case of touch-screen devices. Storage devices 42 include computer-readable media enabling the storage, reading, and writing of software instructions and/or data. Exemplary storage devices 42 include magnetic and optical disks and flash memory devices, as well as removable media such as CD and/or DVD disks and drives. Communication interface controller 46 enables system 18 to connect to a computer network and/or to other machines/computer systems. Typical communication interface controllers 46 include network adapters. Buses 38 collectively represent the plurality of system, peripheral, and chipset buses, and/or all other circuitry enabling the inter-communication of devices 34-46 of computer system 18.

Figure 3:
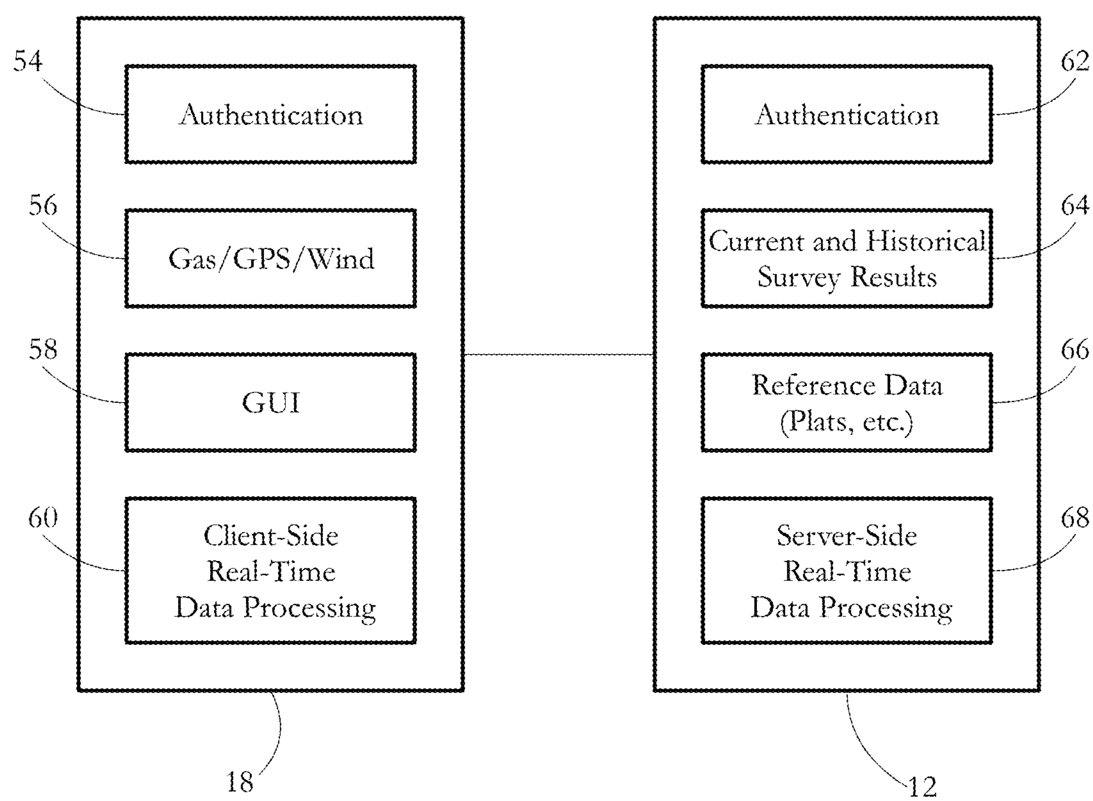
FIG. 3 shows a number of application or modules running on a client computer system and a corresponding server computer system according to some embodiments of the present invention.

FIG. 3 shows a number of applications or modules running on an exemplary client computer system 18 and corresponding server computer system 12. Authentication applications 54, 62 are used to establish secure communications between computer systems 12, 18, allowing client computer system 18 selective access to the data of a particular customer or user account. A client data collection module 56 collects real-time gas concentration, location data such as global positioning system (GPS) data, as well as wind speed and wind direction data. A graphical user interface (GUI) module 58 is used to receive user input and display survey results and other GUI displays to system users. A client-side real-time data processing module 60 may be used to perform at least some of the data processing described herein to generate survey results from input data. Data processing may also be performed by a server-side data processing module 68. Server computer system 12 also maintains one or more application modules and/or associated data structures storing current and past survey results 64, as well as application modules and/or data structures storing reference data 66 such as plats indicating the geographic locations of natural gas pipelines.

Figure 4:
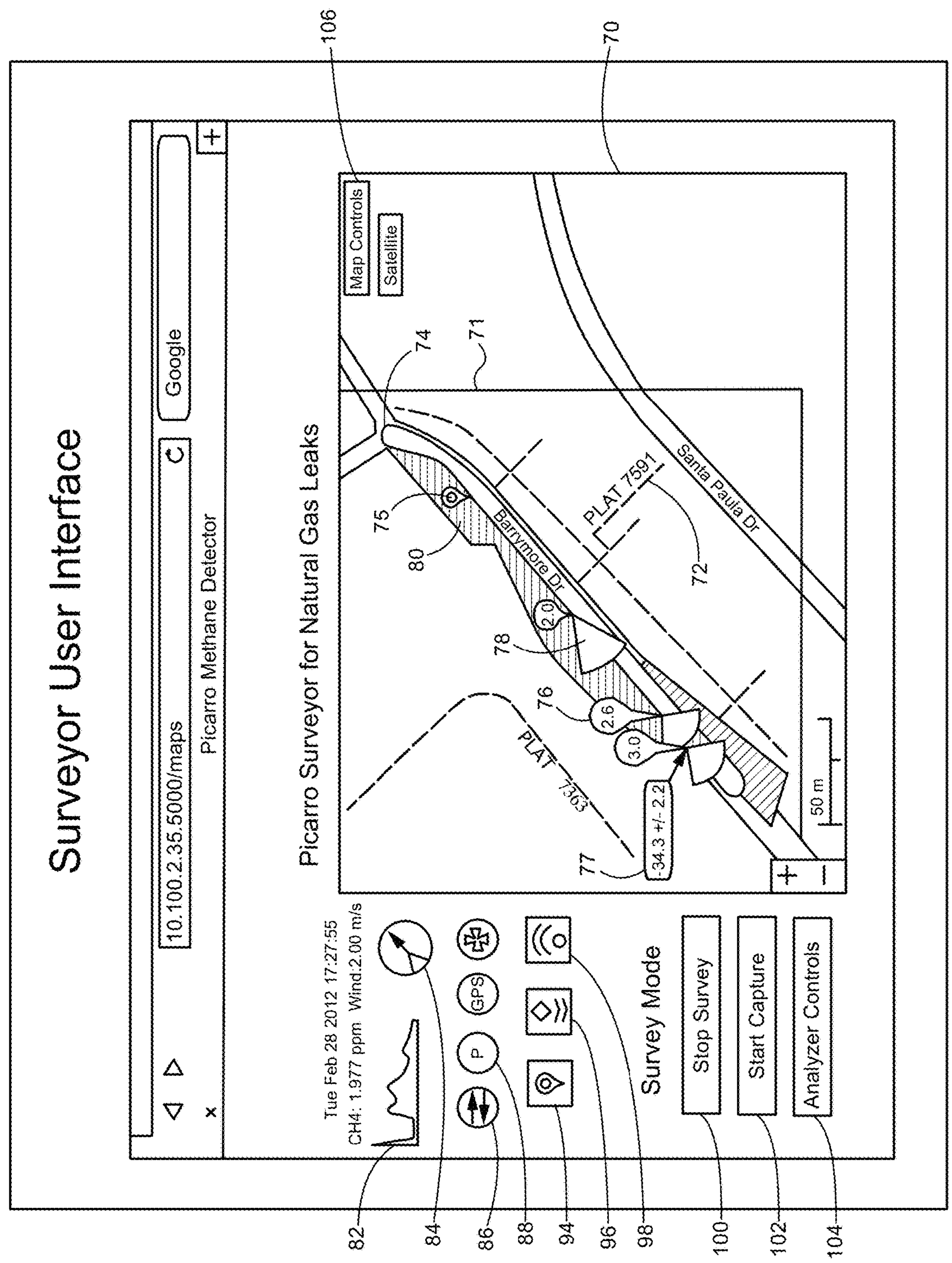
FIG. 4 is a schematic drawing of a screen shot on a graphical user interface displaying survey results on a street map according to some embodiments of the present invention.

FIG. 4 is a schematic drawing of a screen shot on a graphical user interface, displaying survey results on a street map 70 according to some embodiments of the present invention. The GUI screenshots are most preferably displayed on a client device in the vehicle, which may be connected to a server as described above. The illustrated screenshots show both exemplary user input, which may be used to control system operation, and exemplary real-time displays of collected/processed data. In the example, it includes the geo-referenced street map 70 showing plat lines 72. The plat lines 72 are preferably derived from gas company records. An active pipeline plat boundary 71 may also be displayed on the map 70. A user-selectable button 96 may be selected to overlay a selected pipeline plat on the map 70. Superimposed on the map 70 are one or more lines (preferably in a distinguishing color not shown in patent drawings) indicating the path 74 driven by the vehicle with the mobile gas measurement device on one or more gas survey routes. In this example, the path 74 shows the vehicle U-turned at the Y-shaped intersection. Optionally, a current location icon 75 may be overlaid on the map 70 to indicate the current surveyor location, e.g., the position of the vehicle with a gas measurement device and wind measurement device. A user-selectable button 94 may be selected to center the map 70 by current surveyor location. Also provided is a user-selectable start button 102 and stop button 100 to start/stop capturing gas for analysis. An analyzer control button 104 is user-selectable to control analyzer operations (e.g., shut down, start new trace, run isotopic analysis, etc.).

Peak markers 76 show the locations along the path 74 where peaks in the gas concentration measurements, which satisfy the conditions for being likely gas leak indications, were identified. The colors of the peak markers 76 may be used to distinguish data collected on different runs. The annotations within the peak markers 76 show the peak concentration of methane at the locations of those measurement points (e.g., 3.0, 2.6, and 2.0 parts per million). An isotopic ratio marker 77 may be overlaid on the map 70 to indicate isotopic ratio analysis output and tolerance (e.g., −34.3+/−2.2). Also displayed on the map 70 are search area indicators 78, preferably shown as a sector of a circle having a distinguishing color. Each of the search area indicators 78 indicates a search area suspected to have a gas leak source. The opening angle of the search area indicator 78 depicts the variability in the wind direction. The axis of the search area indicator 78 (preferably an axis of symmetry) indicates the likely direction to the potential gas leak source. Also displayed on the map 70 are one or more survey area indicators 80 (shown as hatched regions in FIG. 4) that indicate a survey area for a potential gas leak source. The survey area indicator 80 adjoins the path 74 and extends in a substantially upwind direction from the path. The survey area marked by each indicator 80 is preferably displayed as a colored swath overlaid or superimposed on the map 70. For example, the colored swaths may be displayed in orange and green for two runs. In preferred embodiments, the parameters of the search area indicators 78 and the survey area indicators 80 (described in greater detail with reference to FIGS. 8-11 below) are derived from measurements of the wind, the velocity of the vehicle, and optionally the prevailing atmospheric stability conditions.

Referring still to FIG. 4, the surveyor user interface also preferably includes a real-time CH4 concentration reading

82. A wind indicator symbol 84 preferably displays real-time wind information, which may be corrected for the velocity vector of the vehicle to represent the true wind rather than the apparent wind when the vehicle is in motion. Average wind direction is preferably indicated by the direction of the arrow of the wind indicator symbol 84, while wind direction variability is indicated by the degree of open angle of the wedge extending from the bottom of the arrow. Wind speed is preferably indicated by the length of the arrow in the wind indicator symbol 84. An internet connection indicator 98 blinks when the internet connection is good. A data transfer status button 86 is user-selectable to display data transfer status (e.g., data transfer successful, intermittent data transfer, or data transfer failed). An analyzer status button 88 is user-selectable to display current analyzer status such as cavity pressure, cavity temperature, and warm box temperature. A map control button 106 is user-selectable to open a map controls window with user-selectable layer options, discussed below with reference to FIG. 7.

Figure 5:
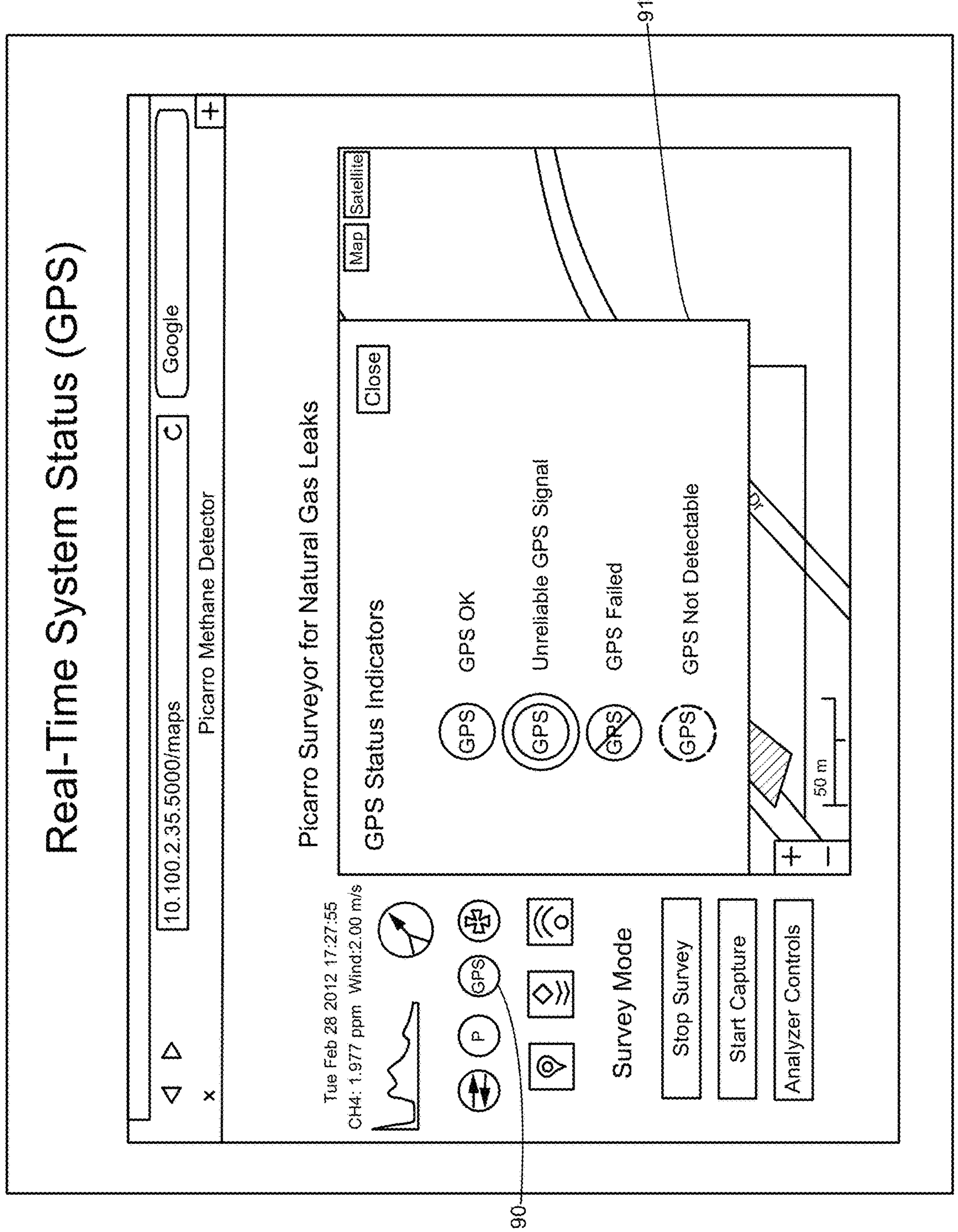
FIG. 5 is a schematic drawing of a screen shot on a graphical user interface with GPS indicators according to some embodiments of the present invention.

FIG. 5 is a schematic drawing of a screen shot on the graphical user interface, displaying a GPS status window 91, according to some embodiments of the present invention. A user-selectable GPS status button 90 may be selected to open the GPS status window 91. The GPS status window 91 preferably includes indicators of the current GPS status, such as "GPS OK", "Unreliable GPS signal", "GPS Failed", or "GPS Not Detectable".

Figure 6:
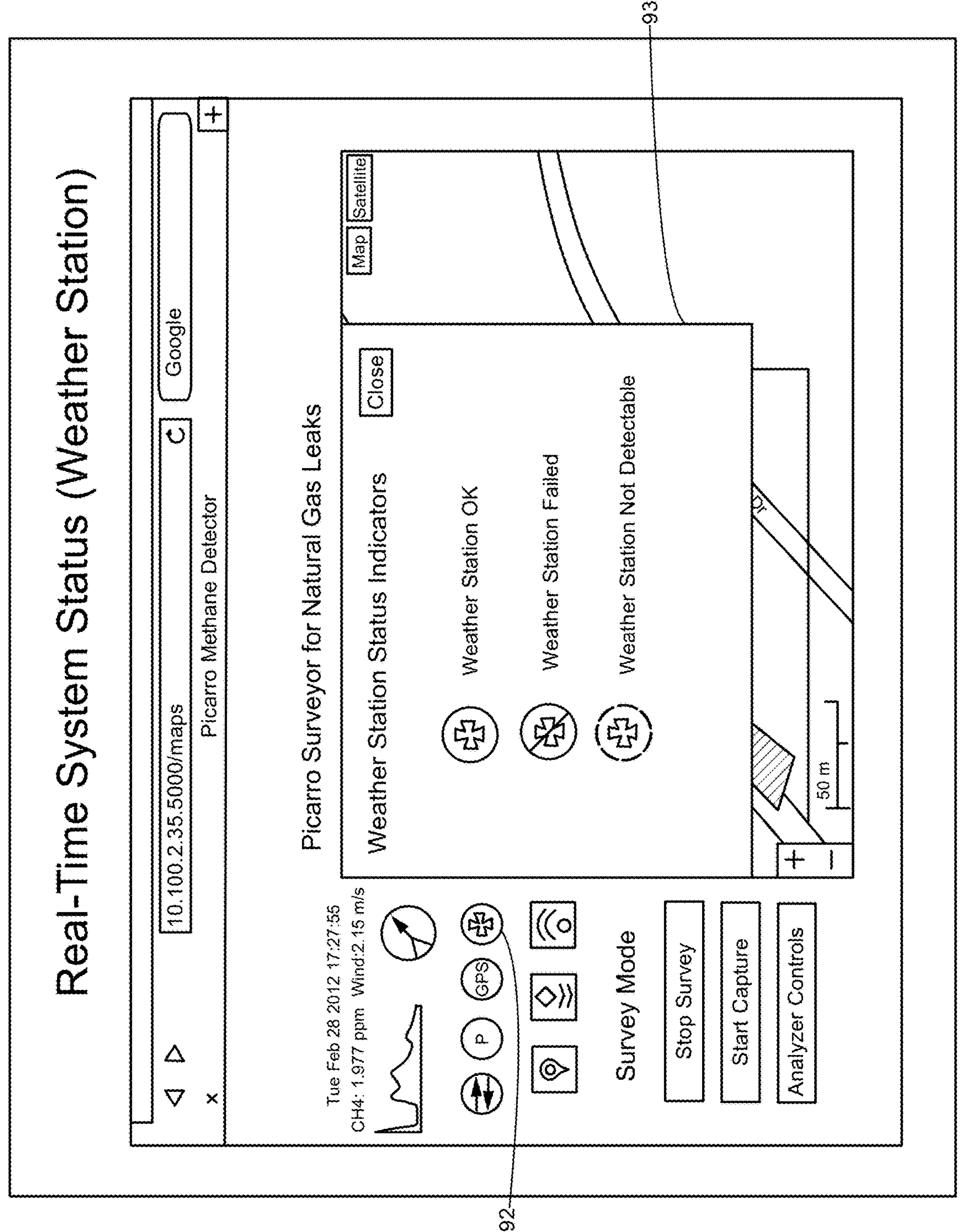
FIG. 6 is a schematic drawing of a screen shot on a graphical user interface with weather station status indicators according to some embodiments of the present invention.

FIG. 6 is a schematic drawing of a screen shot on the graphical user interface, displaying a weather station status window 93, according to some embodiments of the present invention. A user-selectable weather station status button 92 may be selected to open the weather station status window 93. The weather station status window 93 preferably includes indicators of the current weather station status, such as "Weather Station OK", "Weather Station Failed", or "Weather Station Not Detectable". Weather station data are preferably received in real-time and may include wind data and atmospheric stability conditions data relevant to the area being surveyed.

Figure 7:
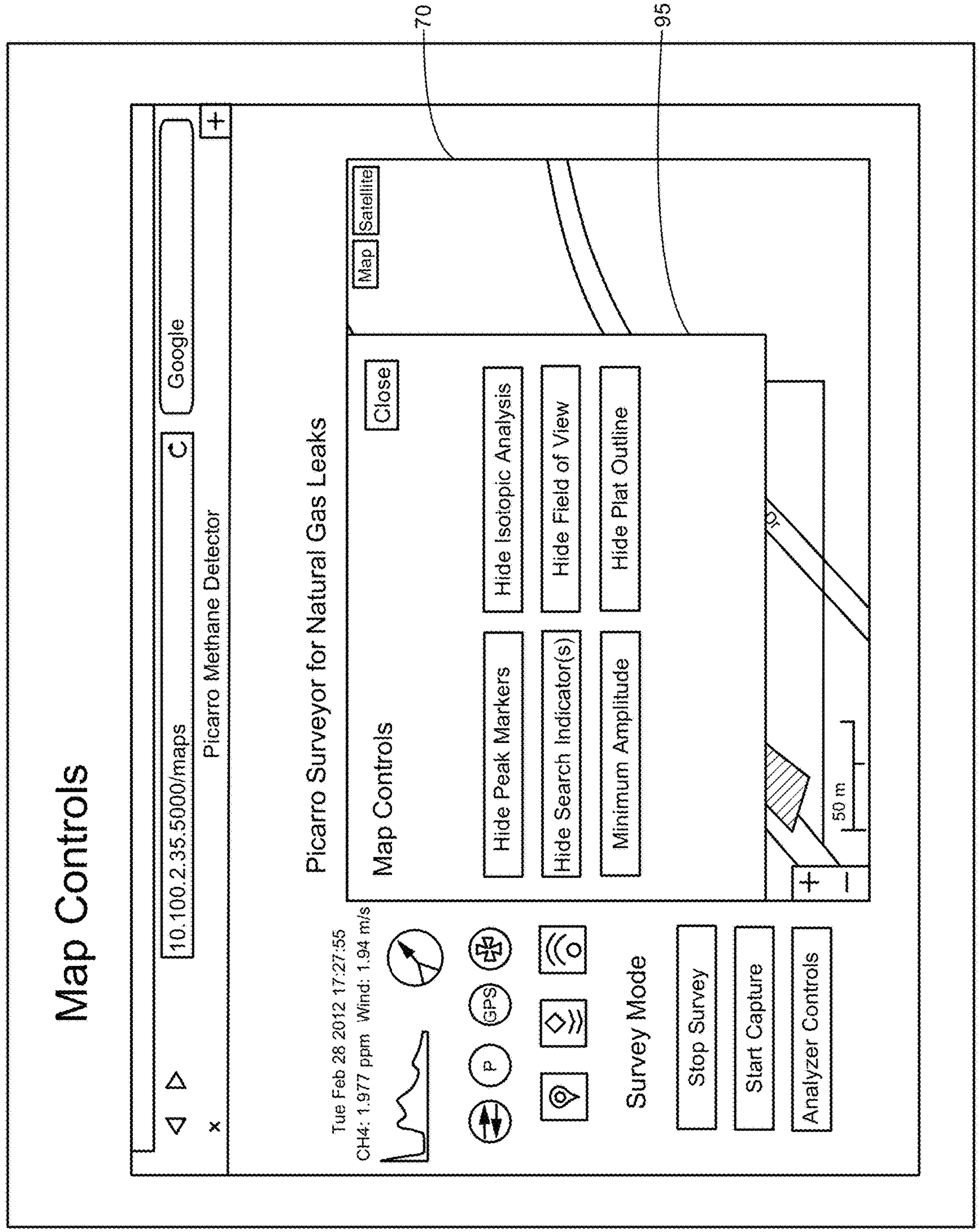
FIG. 7 is a schematic drawing of a screen shot on a graphical user interface with map controls according to some embodiments of the present invention.

FIG. 7 is a schematic drawing of a screen shot on the graphical user interface, displaying a map control window 95. Various elements displayed on the map 70 are regarded as layers which may be turned on or off. In this example, map controls window 95 includes six user-selectable buttons named "Hide Peak Markers", "Hide Search Area Indicators", "Minimum Amplitude", "Hide Isotopic Analysis", "Hide Field of View", and "Hide Plat Outline". The "Hide Peak Markers" button may be selected so that the markers indicating peak gas concentration measurements are not displayed on the map 70. The "Hide Search Area Indicators" button may be selected so that the search area indicators are not displayed on the map 70. The "Minimum Amplitude" button may be selected so that gas concentration peaks not meeting a minimum amplitude requirement are not displayed on the map 70. The "Hide Isotopic Analysis" button may be selected so that isotopic ratio analysis information is not displayed on the map 70 next to the peak markers. The "Hide Field of View" button may be selected so that the survey area indicator(s) are not displayed on the map 70. The "Hide Plat Outline" button may be selected so that the plat lines are not displayed on the map 70.

Figure 8:
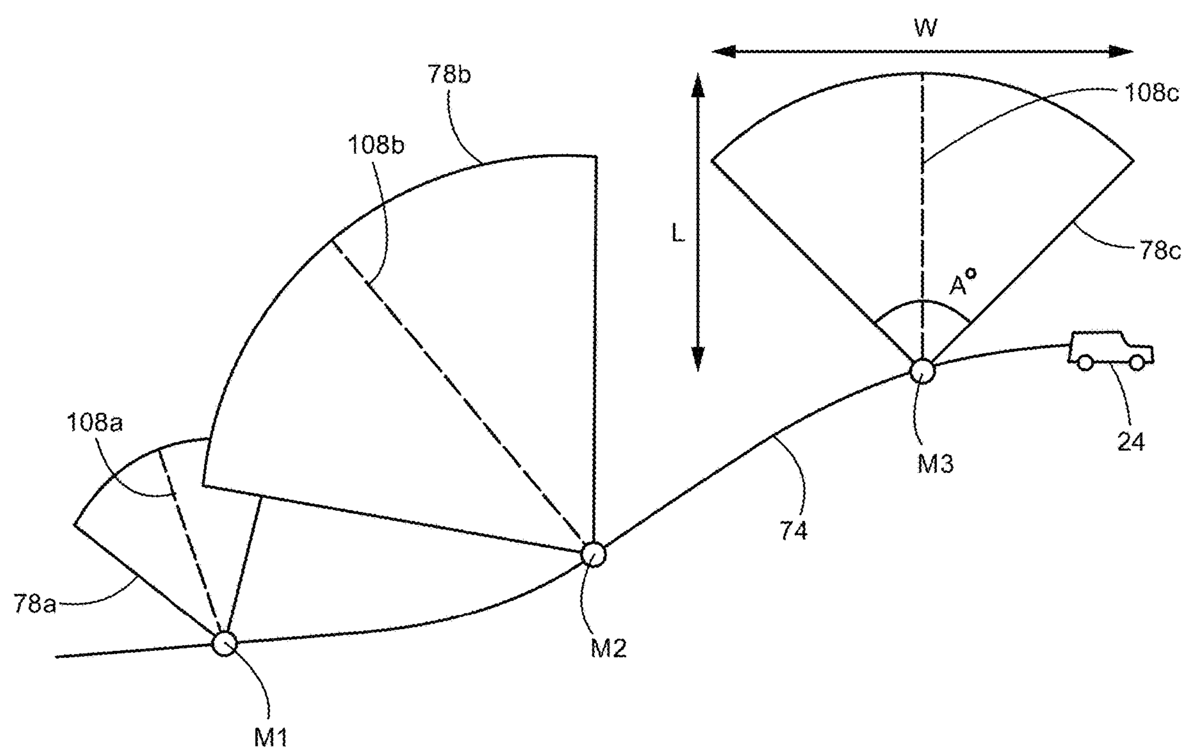
FIG. 8 is a schematic diagram of three search area indicators according to some embodiments of the present invention.

FIG. 8 is a schematic diagram of three search area indicators 78*a*, 78*b*, and 78*c* according to some embodiments of the present invention. Each of the search area indicators 78*a*, 78*b*, and 78*c* has a respective axis 108*a*, 108*b*, and 108*c* indicating a representative wind direction relative to a geo-referenced location of a corresponding gas concentration measurement point M1, M2, and M3. The gas concentration measurement points M1, M2, and M3 are positioned along the path 74 traveled by the vehicle 24 that carries a GPS device, a mobile gas measurement device, and wind measurement device for taking wind direction measurements and wind speed measurements. Each of the search area indicators, such as the search area indicator 78*c*, preferably has a width W relative to its axis 108*c*. The width W is indicative of a wind direction variability associated with wind direction measurements in the area of the gas concentration measurement point M3. In preferred embodiments, the width W is indicative of a variance or standard deviation of the wind direction measurements. Also in preferred embodiments, the search area indicator 78*c* has the shape of a sector of a circle, with the center of the circle positioned on the map at the location of the gas concentration measurement point M3. Most preferably, the angle A subtended by the sector of the circle is proportional to a standard deviation of the wind direction measurements taken at or nearby the measurement point M3. For example, the angle A may be set to a value that is twice or four times the angular standard deviation of the wind direction measurements. It is not necessary to display the gas concentration measurement points M1, M2, and M3 on the map along with the search area indicators 78*a*, 78*b*, and 78*c*. As previously shown in FIGS. 4 and 7, the measurement points and associated gas concentration measurements are preferably map layer options for an end-user that may be turned on or off.

Referring again to FIG. 8, the axis 108*c* of the search area indicator 78*c* is preferably an axis of symmetry and points in a representative wind direction relative to the gas concentration measurement point M3. The representative wind direction is preferably a mean, median or mode of the wind direction measurements taken at or nearby the measurement point M3, and indicates the likely direction to a potential gas leak source. The wind direction measurements may be taken from the vehicle 24 as it moves and converted to wind direction values relative to the ground (e.g., by subtracting or correcting for the velocity vector of the vehicle). In some embodiments, the axis 108*c* has a length L indicative of a maximum detection distance value representative of an estimated maximum distance from a potential gas leak source at which a gas leak from the source can be detected. For example, the length may be proportional to the maximum detection distance value, or proportional to a monotonically increasing function of the maximum detection distance value, such that longer maximum detection distance values are represented by longer axis lengths. In preferred embodiments, the maximum detection distance value and corresponding length L are determined according to data representative of wind speed in the search area. In some embodiments, the maximum detection distance value and the corresponding length L are determined according to data representative of atmospheric stability conditions in the search area. Each of the search area indicators 78*a*, 78*b*, and 78*c* may thus provide a visual indication of a likely direction and estimated distance to a potential gas leak source. Although a sector of a circle is the presently preferred shape for a search area indicator, alternative shapes for a search area indicator include, but are not limited to, a triangle, a trapezoid, or a wedge.

Figure 9:
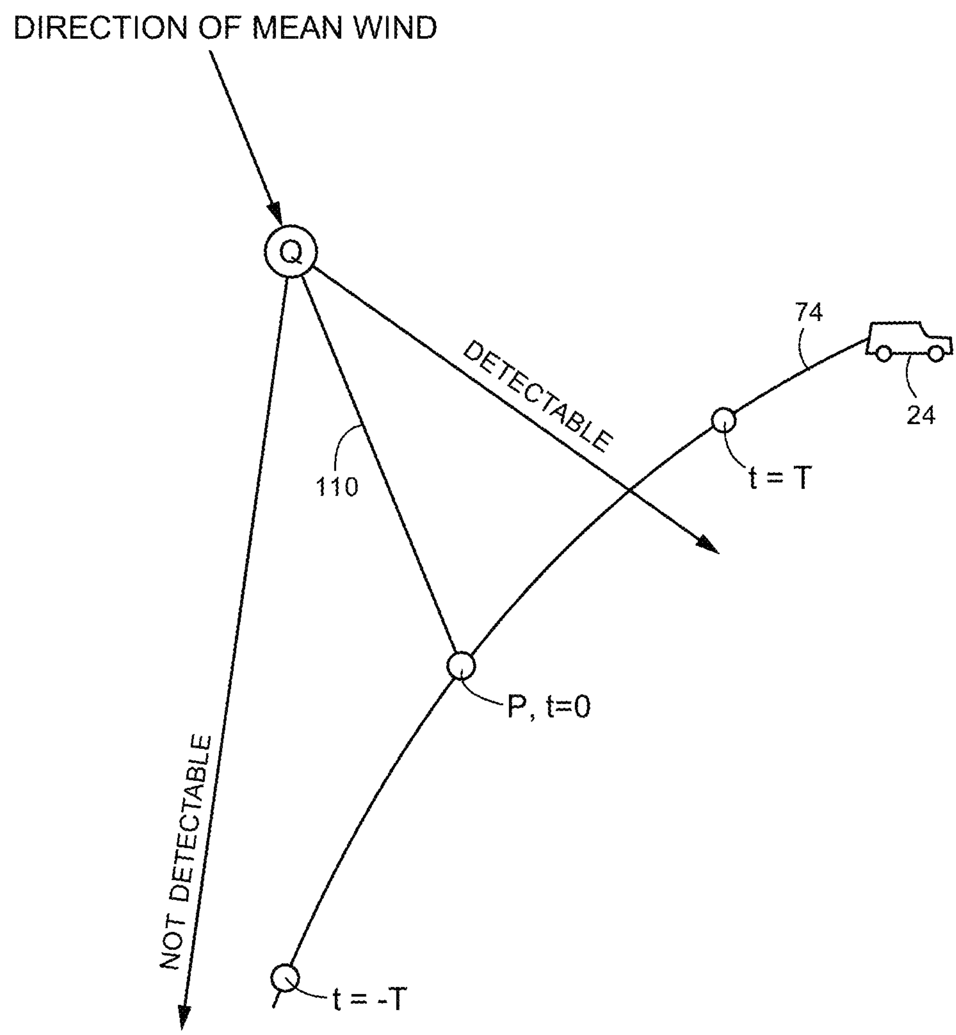
FIG. 9 is a schematic diagram illustrating wind lines relative to the path of a mobile gas measurement device for detecting or not detecting a gas leak from a potential gas leak source according to some embodiments of the present invention.

FIG. 9 is a schematic diagram illustrating an example of detecting or not detecting a gas leak from a potential gas leak source, according to some embodiments of the present invention. An indicator of a survey area (also sometimes referred to as a "field of view") is intended as an indication of how well the measurement process surveys the area around the path 74 traveled by the vehicle 24 that carries a GPS device, a mobile gas measurement device, and wind measurement device. The survey area indicator is designed such that if a potential gas leak source is located in the survey area and has a rate of leakage meeting a minimum leak rate condition, then an estimated probability of detection of a gas leak from the potential gas leak source at one or more measurement points P along the path 74 satisfies a probability condition.

Whether or not a potential gas leak source of a given strength is detectable by a gas measurement device of a given sensitivity depends on the separation distance of the source from the gas measurement device and on whether the wind is sufficient to transport gas from the gas leak source to the gas measurement device at some point along the path 74. In some embodiments, a physical model is employed that relates the measured gas concentration peak at the location of the vehicle 24 (in ppm, for example) to the emission rate of the potential gas leak source (in g/sec, for example) and the distance between the source and the detection point.

There are multiple possible models that describe the propagation of a gas leak as a plume through the atmosphere. One well-validated physical model for a plume (Gifford, F. A., 1959. "Statistical properties of a fluctuating plume dispersion model". Adv. Geophys, 6, 117-137) is to model the plume as a Gaussian distribution in the spatial dimensions transverse to the wind direction, or (for a ground level source), the concentration c (x, y, z) at a distance x downwind, y crosswind, and at a height z from a gas leak source of strength Q located on the ground is given by Equation (1):

$$C(x, y, z) = \frac{Q}{\pi v \sigma_y \sigma_z} e^{-y^2/2\sigma_y^2 - z^2/2\sigma_z^2}$$

where v is the speed of the wind, and the plume dispersion half-widths $\sigma_y$ and $\sigma_z$ depend on x via functions that are empirically determined for various atmospheric stability conditions.

If we consider the plume center, where y=z=0, the concentration at the center is given by Equation (2):

$$C_{peak} = \frac{Q}{\pi v \sigma_y \sigma_z} \tag{2}$$

The dimensions of the Gaussian distribution horizontally and vertically, half-widths $\sigma_y$ and $\sigma_z$, increase with increasing distance from the source. The amount they increase can be estimated from measurements of wind speed, solar irradiation, ground albedo, humidity, and terrain and obstacles, all of which influence the turbulent mixing of the atmosphere. However, if one is willing to tolerate somewhat more uncertainty in the distance estimation, the turbulent mixing of the atmosphere can be estimated simply from the wind speed, the time of day, and the degree of cloudiness, all of which are parameters that are available either on the vehicle 24 or from public weather databases in real time. Using these available data, estimates of the Gaussian width parameters can be estimated using the Pasquill-Gifford-Turner turbulence typing scheme (Turner, D. B. (1970). "Workbook of atmospheric dispersion estimates". US Department of Health, Education, and Welfare, National Center for Air Pollution Control), or modified versions of this scheme.

For a given sensitivity of the gas measurement device, there is a minimum concentration which may be detected. Given a gas leak source of strength greater than or equal to the minimum concentration, the source will be detected if it is closer than an estimated maximum distance $X_{max}$, where this is the distance such that $\sigma_y\sigma_z$=Q/(πvc). If the wind is blowing gas directly from the gas leak source to the gas measurement device, the estimated maximum distance $X_{max}$ is the distance beyond which the source may be missed. This estimated maximum detection distance may depend upon atmospheric stability conditions as well as wind speed. The formula diverges to infinity when the wind speed is very small, so it is advisable to set a lower limit (e.g., 0.5 m/s) for this quantity.

The minimum leak rate $Q_{min}$ is determined by the requirements of the application. For natural gas distribution systems, a minimum leak rate of 0.5 scfh (standard cubic feet per hour) may be used; below this level, the leak may be considered unimportant. Other minimum leaks rates (e.g. 0.1 scfh, 1 scfh, or other values within or outside this range) may be used for natural gas or other leak detection applications. The minimum detection limit of the plume $C_{min}$ is given either by the gas detection instrument technology itself, or by the spatial variability of methane in the atmosphere when leaks are not present. A typical value for $C_{min}$ is 30 ppb (parts-per-billion) above the background level (typically 1,800 ppb). Given these two values for $Q_{min}$ and $C_{min}$, and by predicting $\sigma_y$ and $\sigma_z$ given atmospheric measurements (or with specific assumptions about the state of the atmosphere, such as the stability class), one may then determine the estimated maximum detection distance $X_{max}$ by determining the value for $X_{max}$ that satisfies the following equality, Equation (3):

$$C_{min} = \frac{Q_{min}}{\pi v \sigma_y \sigma_z}. \tag{3}$$

In some embodiments the relationship between $\sigma_y$ and $\sigma_z$ and $X_{max}$ is provided by a functional relationship, a lookup table, or similar method. Because $\sigma_y$ and $\sigma_z$ are monotonically increasing functions of $X_{max}$, a unique value can be determined from this process. For example, one useful functional form is a simple power law, where the coefficients a, b, c, and d depend on atmospheric conditions: $\sigma_y=ax^b$; $\sigma_z=cx^d$.

In some embodiments, the concentration C measured close to the ground of a Gaussian plume due to a gas leak source on the ground depends on the rate of emission Q of the source, the distance x between the source and the gas measurement device, and the speed of the wind blowing from the source to the gas measurement device, in accordance with an expression of the form (Equation 4):

$$C = \frac{Q}{\pi v \sigma_y(x) \sigma_z(x)} \tag{4}$$

The expressions for $\sigma_y(x)$ and $\sigma_z(x)$ depend on the stability class of the atmosphere at the time of measurement. In some embodiments, the stability class of the atmosphere is inferred from the answers to a set of questions given to the operator, or from instruments of the vehicle, or from data received from public weather databases. As shown in the table of FIG. 18, coefficients A, B, C, D, E and F may depend on surface wind speed and atmospheric conditions such as day or night, incoming solar radiation, and cloud cover. Mathematical forms for $\sigma_y(x)$ and $\sigma_z(x)$ are documented in Section 1.1.5 of the User's Guide for Industrial Source Complex (ISC3), Dispersion Models Vol. 2 (US Environmental Protection Agency document EPA-454/B955-003b September 1995). Given the sensitivity of the gas measurement device and the rate of emission of the smallest potential gas leak source of interest, equation (4) may be solved to find the estimated maximum distance $X_{max}$ beyond which a potential gas leak source may be missed by the gas measurement device.

Figure 16:
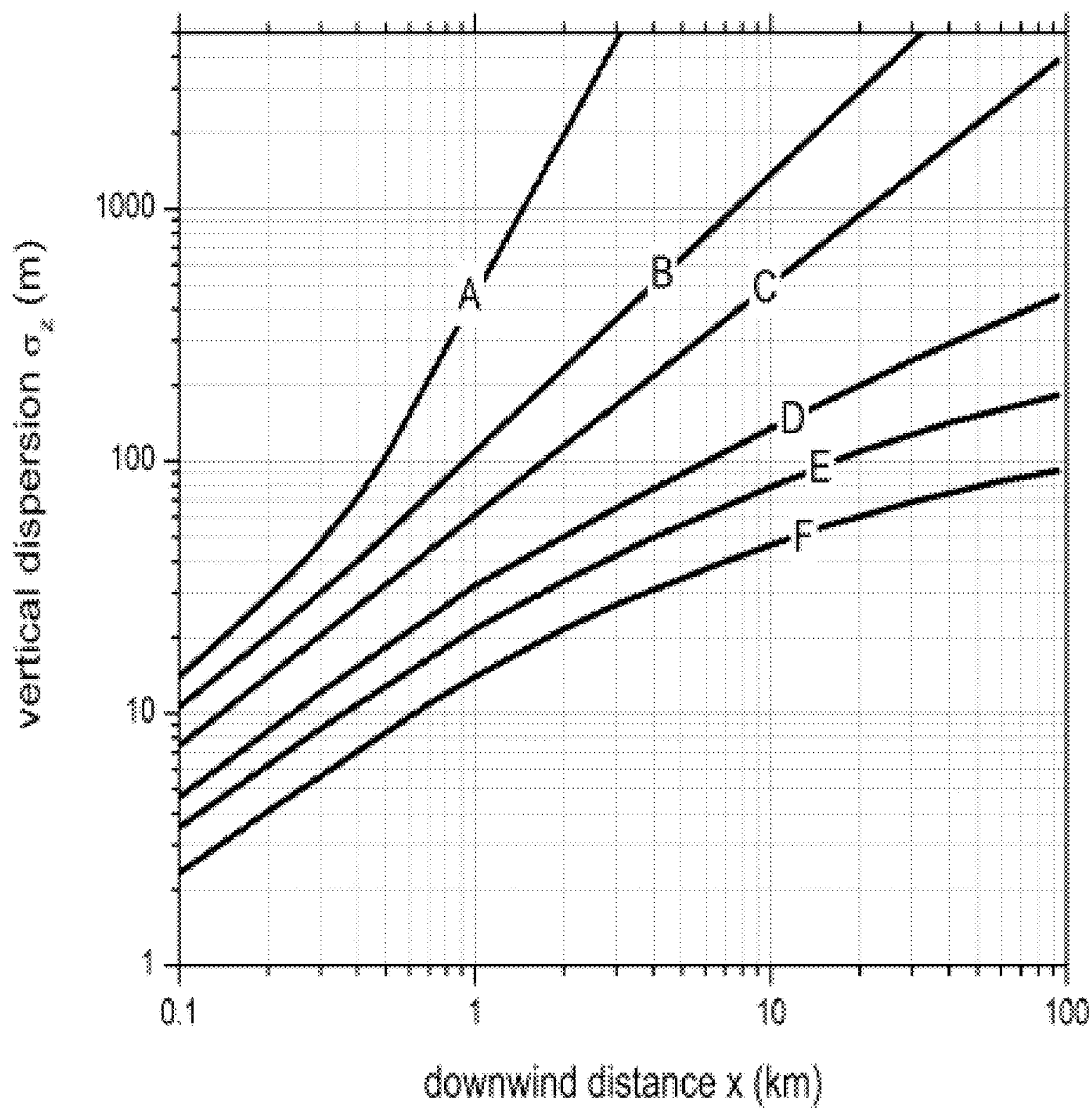
FIG. 16 is a graph of vertical dispersion coefficients of a gas plume as a function of downwind distance from a gas leak source according to some embodiments of the present invention.
Figure 17:
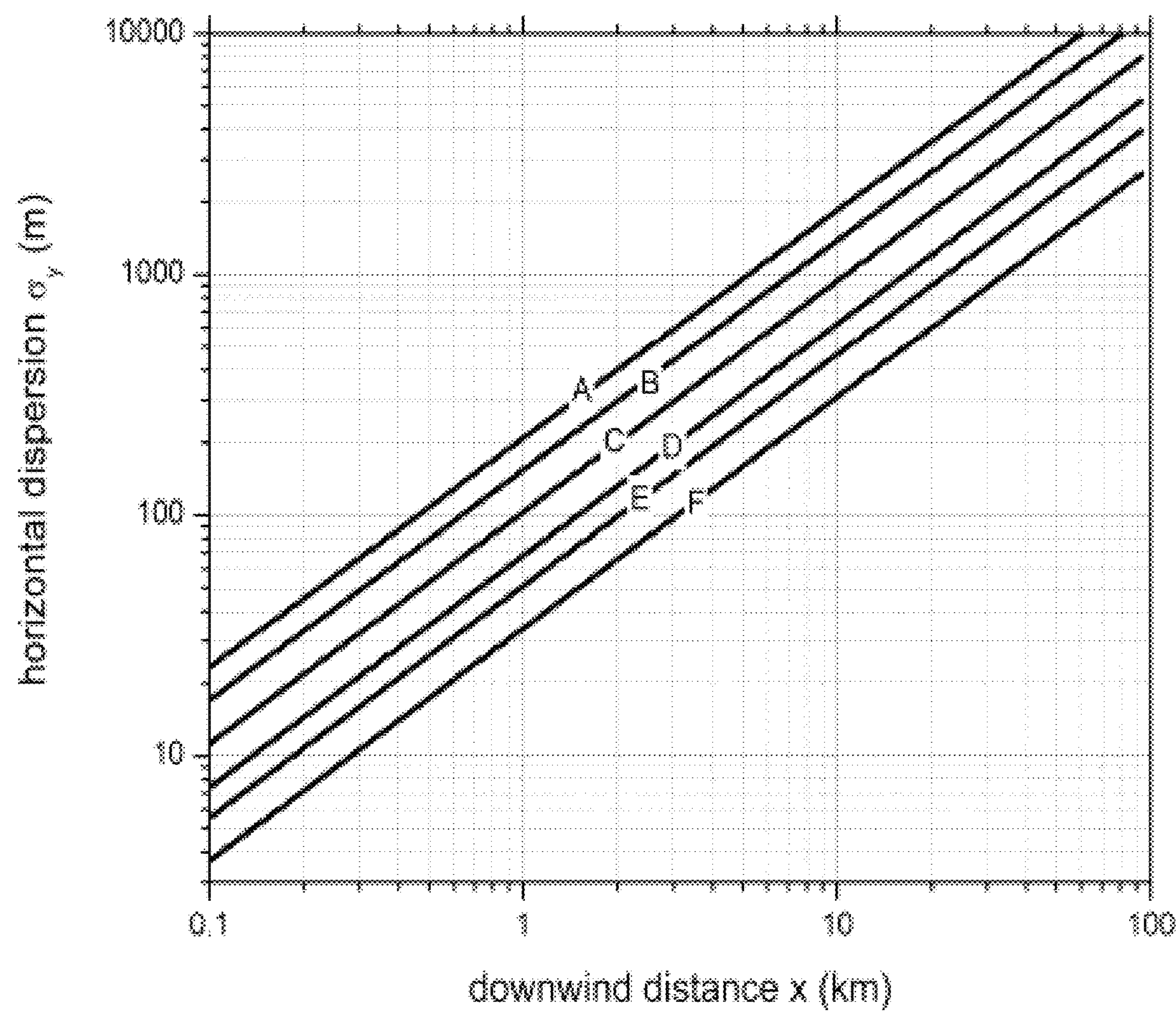
FIG. 17 is a graph of crosswind dispersion coefficients of a gas plume as a function of downwind distance from a gas leak source according to some embodiments of the present invention.

FIG. 16 is a graph of vertical $\sigma_z(x)$ dispersion coefficients of a gas plume as a function of downwind distance from a gas leak source according to some embodiments of the present invention. FIG. 17 is a graph of crosswind $\sigma_y(x)$ dispersion coefficients of a gas plume as a function of downwind distance from a gas leak source according to some embodiments of the present invention. The graphs are from from de Nevers, 2000, Air Pollution Control Engineering, The McGraw-Hill Companies, Inc. The dispersion coefficients are functions of downwind distance x. In this example, dispersion coefficients are calculated based on atmospheric stability. The table of FIG. 18 gives the atmospheric stability class as a function of wind speed, day or night, cloud cover, and solar radiation. In some embodiments, the dispersion coefficients and/or the estimated maximum distance $X_{max}$ may depend upon an urban or rural environment for the gas concentration measurements and plume dispersion. For example, the estimated maximum distance $X_{max}$ may be less in an urban environment with buildings or other structures than in a rural environment.

The actual distance at which a gas leak source may be detected is reduced if there is some variability or uncertainty in the direction of the wind. This is because there is a probability that the wind blows gas in a direction such that it does not intercept the path 74 of the vehicle 24 (FIG. 9). In practice this uncertainty is usually larger than the intrinsic angular uncertainty $\sigma_y/x$ implied by the Gaussian plume model. In order to determine the effective survey area of the mobile gas measurement device, assume for this example that the wind speed remains approximately constant within a time interval $-T<t<T$ bounding the time $t=0$ at which the vehicle 24 passes through a particular point P on the path 74, but that the wind direction (angle) is distributed as a Gaussian with a known mean and standard deviation.

As shown in FIG. 9, we consider the line 110 through the measurement point P pointing toward the direction of the mean wind, and whether a candidate point Q on this line qualifies to be within the boundary of the survey area (i.e., within the field of view of the mobile gas measurement device of the vehicle 24). We also consider drawing a sample from the distribution of wind directions and drawing a line through the candidate point Q in this direction. If this line intersects the path 74 of the vehicle 24 within the time interval $-T<t<T$, and the distance from the candidate point Q to the point of intersection with the path 74 is less than or equal to the estimated maximum distance $X_{max}$, then this is regarded as detectable by the mobile gas measurement device since the potential gas leak source at the candidate point Q would have been detected along the path 74. The quantity T sets the time interval during which it is expected to detect the gas coming from the candidate point Q at measurement point P. Theoretically, the time interval can be large, but it may not be reasonable to assume that the wind statistics remain unchanged for an extended period of time. In some embodiments, the wind direction measurements are taken during a time interval less than or equal to about 2 minutes, during which time interval a gas concentration is measured at the gas concentration measurement point P. More preferably, the time interval is in the range of 10 to 20 seconds.

Figure 10:
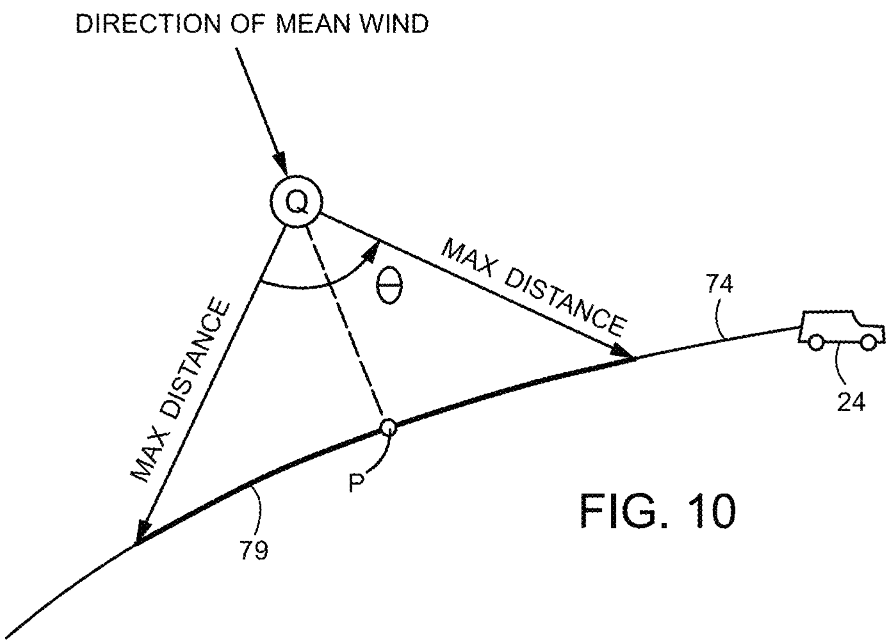
FIG. 10 is a schematic diagram of wind direction and a path of a mobile gas measurement device used to estimate a probability of detection of a gas leak from a potential gas leak source at one or more measurement points along the path according to some embodiments of the present invention.

FIG. 10 is a schematic diagram showing the estimation of a probability of detection at the measurement point P of a gas leak from a potential gas leak source at the candidate point Q, according to some embodiments of the present invention. The probability of detection at measurement point P is estimated according to an angle θ subtended by a segment 79 of the path 74 relative to the candidate point Q for the potential gas leak source. The path segment 79 is positioned within a distance of the candidate point Q that is less than or equal to the estimated maximum distance $X_{max}$. The probability of detection is preferably estimated according to a cumulative probability of wind directions with respect to the subtended angle θ. The cumulative probability of wind directions may be determined according to a representative wind direction (e.g., a mean, median, or mode of the wind direction measurements) and a wind direction variability (e.g., variance or standard deviation) calculated from the wind direction measurements.

The candidate point Q is deemed to be within the boundary of the survey area if the probability of successful detection of a potential gas leak source at the candidate point Q, over the distribution of wind directions, satisfies a probability condition. In some embodiments, the probability condition to be satisfied is an estimated probability of successful detection greater than or equal to a threshold value, typically set at 70%. In general, as the candidate point Q is moved a farther distance from the gas concentration measurement point P, the range of successful angles becomes smaller and the probability of success decreases, reaching a probability threshold at the boundary of the territory deemed to be within the survey area.

Figure 11:
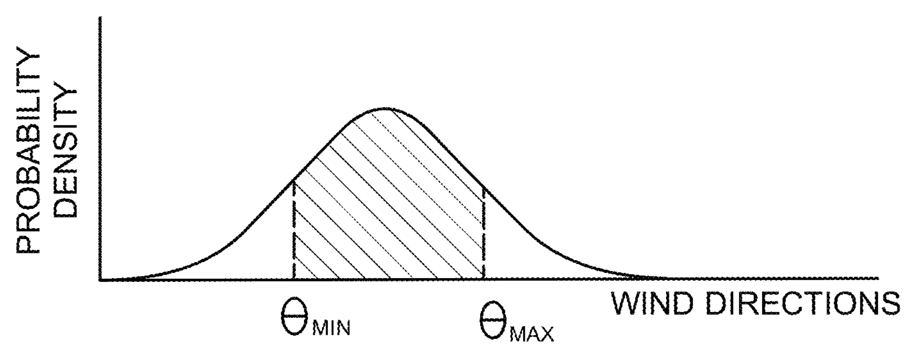
FIG. 11 is a graph of probability density vs. wind directions for estimating a probability of detection of a gas leak from a potential gas leak source according to some embodiments of the present invention.

FIG. 11 is a graph of probability density vs. wind directions for estimating a probability of detection of a gas leak from a potential gas leak source, according to some embodiments of the present invention. The area under the curve spans a range of possible angles θ for the successful detection of a potential gas leak from a candidate point. The probability density is preferably generated as a Gaussian or similar distribution from the calculated mean and standard deviation of the wind direction measurements in the area of the gas concentration measurement point P, FIG. 10. If the angle θ subtended by the path segment 79 relative to the candidate point Q encompasses a percentage of possible wind vectors that is greater than equal to a threshold percentage (e.g., 70%, although the percentage may be adjusted to other values such as 50%, 60%, 67%, 75%, 80%, or 90% in some embodiments), and if the distance from the candidate point Q to the measurement point P is less than the estimated maximum distance $X_{max}$, then the candidate point Q is deemed to be within the survey area.

The above process is repeated as different measurement points along the path 74 are chosen and different candidate points are evaluated for the probability of successful detection of a potential gas leak source. The cumulative distribution of the wind direction function together with a root finding algorithm are useful for efficiently determining the boundary of the survey area. For example, referring again to FIG. 10, the root finding algorithm may consider candidate points along the line of mean wind direction starting at the estimated maximum distance $X_{max}$ from measurement point P, and iteratively (e.g. using a bisection or other method) moving closer to the measurement point P along the mean wind direction line until the angle θ subtended by the path segment 79 is sufficient to meet the probability threshold, as determined from the cumulative probability of wind directions over the subtended angle θ, FIG. 11. Referring again to FIG. 4, the survey area indicator 80 may be displayed on the map 70 as a colored "swath" adjoining the path 74 and extending in a substantially upwind direction from the path.

Figure 12:
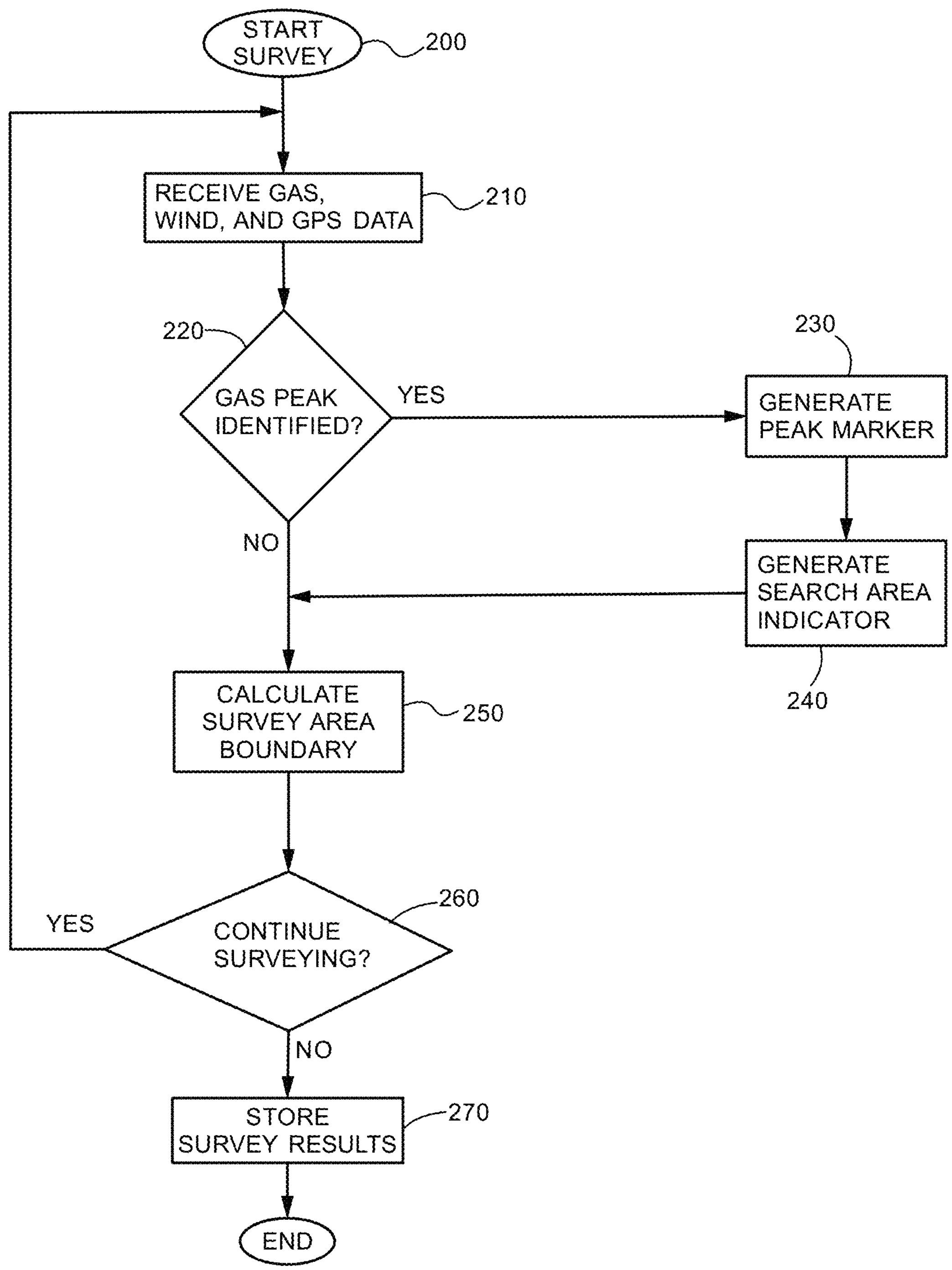
FIG. 12 is a flow chart showing steps for performing a gas leak survey according to some embodiments of the present invention.

FIG. 12 is a flow chart showing a sequence of steps to perform a gas leak survey according to some embodiments of the present invention. In step 200, the survey program is started, preferably by an operator in the vehicle using a graphical user interface (GUI). The operator begins to drive the vehicle on a survey route while the GUI displays a street map (FIG. 4). Gas concentration measurements are preferably performed rapidly along the survey route (e.g., at a rate of 0.2 Hz or greater, more preferably 1 Hz or greater). This enables the practice of driving the vehicle at normal surface street speeds (e.g., 35 miles per hour) while accumulating useful data. The gas concentration is measured initially as a function of time, and is combined with the output of the GPS receiver in order to obtain the gas concentration as a function of distance or location. Interpolation can be used to sample the data on a regularly spaced collection of measurement points. The concentration of methane typically varies smoothly with position, for the most part being equal to the worldwide background level of 1.8 parts per million together with enhancements from large and relatively distant sources such as landfills and marshes.

In step 210, at least one processor (e.g. of a client device, server device, or a combination) receives data representative of measured gas concentrations, wind direction measurements, wind speed measurements, and GPS data. In decision block 220, it is determined if a peak in gas concentration is identified. A peak may be identified from a gas concentration measurement above a certain threshold (or within a certain range), or exceeding background levels by a certain amount, which may be predetermined or user-selected. In some embodiments, the gas concentration and GPS data are analyzed using a peak-location method, and then each identified peak is subsequently fit (using linear or nonlinear optimization) for center and width. The functional form used for this fitting step may be a Gaussian pulse, since a Gaussian is commonly the expected functional form taken by gas plumes propagating through the atmosphere.

If a peak in gas concentration is not identified, then the program proceeds to step 250. If a peak in gas concentration is identified, then a peak marker is generated in step 230. The peak marker may be displayed on the map as a user-selectable layer, as previously discussed with reference to FIG. 4. In step 240, a search area indicator is generated to indicate the likely location of a gas leak source corresponding to the identified peak in gas concentration. The search area indicator may be displayed on the map as a user-selectable layer, as shown in FIG. 4. In step 250, the survey area boundary is calculated, and a survey area indicator may be displayed on the map as a user-selectable layer (hatched region in FIG. 4). In decision step 260, it is determined if the operator wishes to continue surveying (e.g., by determining if the "Stop Survey" button has been selected). If yes, the survey program returns to step 210. If not, the survey results are stored in memory in step 270 (e.g., in the survey results 64 of FIG. 3), and the survey program ends.

Figure 13:
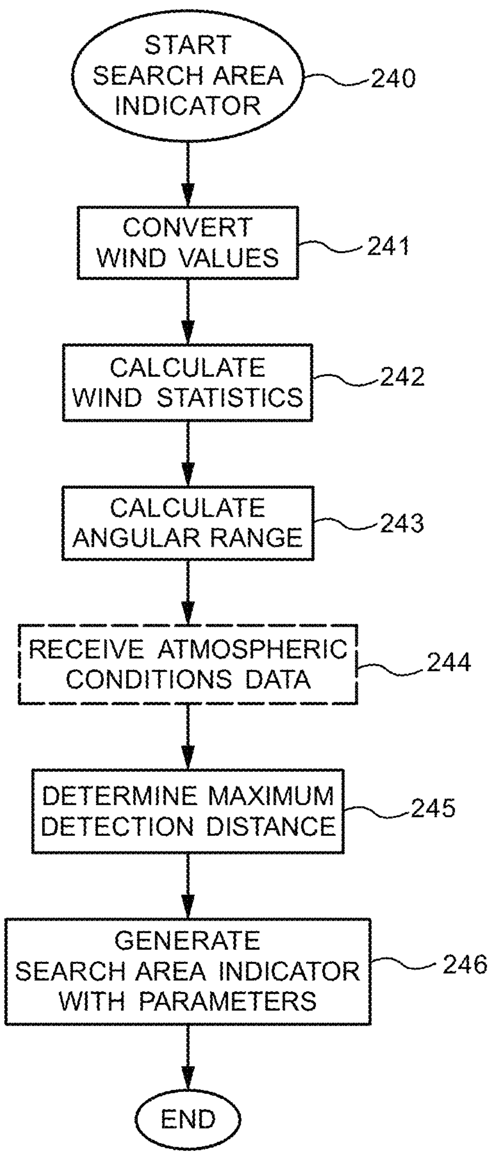
FIG. 13 is a flow chart showing steps for generating a search area indicator according to some embodiments of the present invention.

FIG. 13 is a flow chart showing a sequence of steps performed to generate a search area indicator according to some embodiments of the present invention. When a local enhancement in the gas concentration is detected, the likely direction and estimated distance to the potential gas leak source is preferably calculated from data representative of wind direction and wind speed measured during a time interval just prior to or during which the gas concentration was measured. The time interval is preferably fewer than 2 minutes, and more preferably in the range of 5 to 20 seconds. Calculating statistics from wind measurements may require some conversion if the measurements are made using sensors on a moving vehicle. A sonic anemometer is preferably used to measure wind along two perpendicular axes. Once the anemometer has been mounted to the vehicle, these axes are preferably fixed with respect to the vehicle. In step 241, wind speed and wind direction values that were measured relative to the vehicle are converted to wind speed and wind direction values relative to the ground by subtracting the velocity vector of the vehicle, as obtained from the GPS data. When the vehicle is stationary, GPS velocity may be ineffective for determining the orientation of the vehicle and wind direction, so it is preferable to use a compass (calibrated for true north vs. magnetic north) in addition to the anemometer.

In step 242, wind statistics are calculated from the converted wind values to provide the parameters for the search area indicator. The statistics include a representative wind direction that is preferably a mean, median, or mode of the wind direction measurements. The statistics also include a wind direction variability, such as a standard deviation or variance of the wind direction measurements. In step 243, an angular range of search directions, extending from the location of the gas concentration measurement point where the local enhancement was detected, is calculated according to the variability of the wind direction measurements. In optional step 244, atmospheric conditions data are received. Step 245 is determining a maximum detection distance value representative of the estimated maximum distance from the suspected gas leak source at which a leak can be detected. In some embodiments, the maximum detection distance value is determined according to Equation (3) or Equation (4), and the data representative of wind speed and/or atmospheric stability conditions. Alternatively, the maximum detection distance value may be a predetermined number, a user-defined value, empirically determined from experiments, or a value obtained from a look-up table. In step 246, the search area indicator is generated with the determined parameters, previously discussed with reference to FIG. 8.

Figure 14:
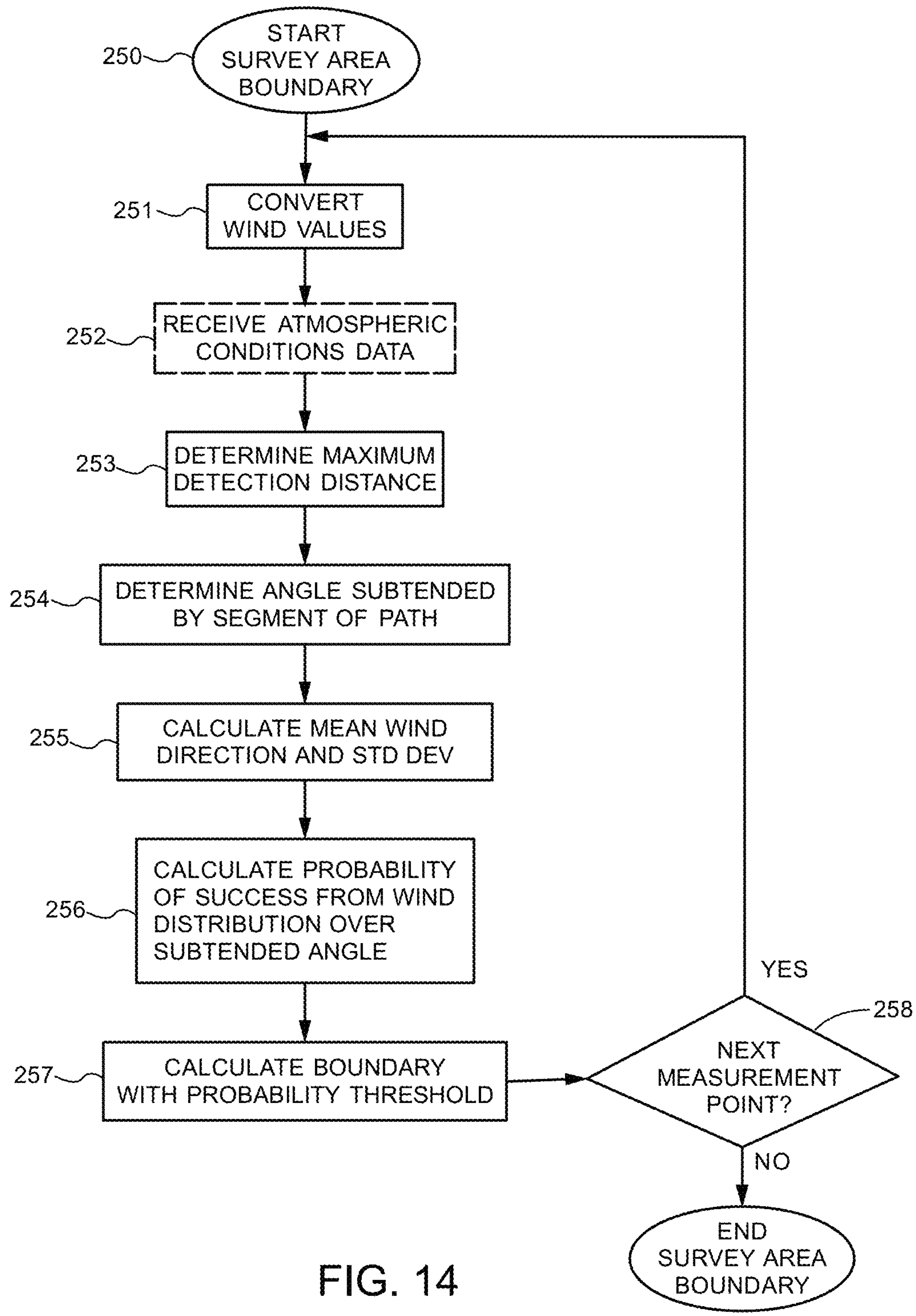
FIG. 14 is a flow chart showing steps for calculating a boundary of a survey area according to some embodiments of the present invention.

FIG. 14 is a flow chart showing a sequence of step performed to calculate a boundary of a survey area according to some embodiments of the present invention. In step 251, wind speed and wind direction values that were measured relative to the vehicle are converted to wind speed and wind direction values relative to the ground by subtracting the velocity vector of the vehicle, as previously described in step 241 above. In optional step 252, atmospheric conditions data are received. Step 253 is determining a maximum detection distance value representative of the estimated maximum distance from a suspected gas leak source at which a leak can be detected. In some embodiments, the maximum detection distance value is determined according to Equation (3) or Equation (4), and the data representative of wind speed and/or atmospheric stability conditions. Alternatively, the maximum detection distance value may be a predetermined number, a user-defined value, empirically determined from experiments, or a value obtained from a look-up table. In step 254, it is determined what angle θ is subtended by a segment of the path of the vehicle relative to the candidate point Q for the potential gas leak source. The path segment is positioned within a distance of the candidate point Q that is less than or equal to the estimated maximum distance.

In step 255, a representative wind direction (e.g., a mean, median, or mode of the wind direction measurements) and a wind direction variability (e.g., variance or standard deviation) are calculated from the wind direction measurements. In step 256, the probability of detection is estimated according to a cumulative probability of wind directions with respect to the subtended angle θ. In step 257, the survey area boundary is calculated with a probability threshold. For example, if the angle θ subtended by the path segment relative to the candidate point encompasses a percentage of possible wind vectors that is greater than equal to a threshold percentage (e.g., 70%,), and if the distance from the candidate point Q to the measurement point P is less than the estimated maximum distance $X_{max}$, then the candidate point Q is deemed to be within the survey area. In decision step 258, it is determined if the survey area boundary function is to continue with the next measurement point. If yes, steps 251-257 are repeated as different measurement points along the path are chosen and different candidate points are evaluated for the probability of successful detection of a potential gas leak source. If not, then the boundary function ends.

Figure 15:
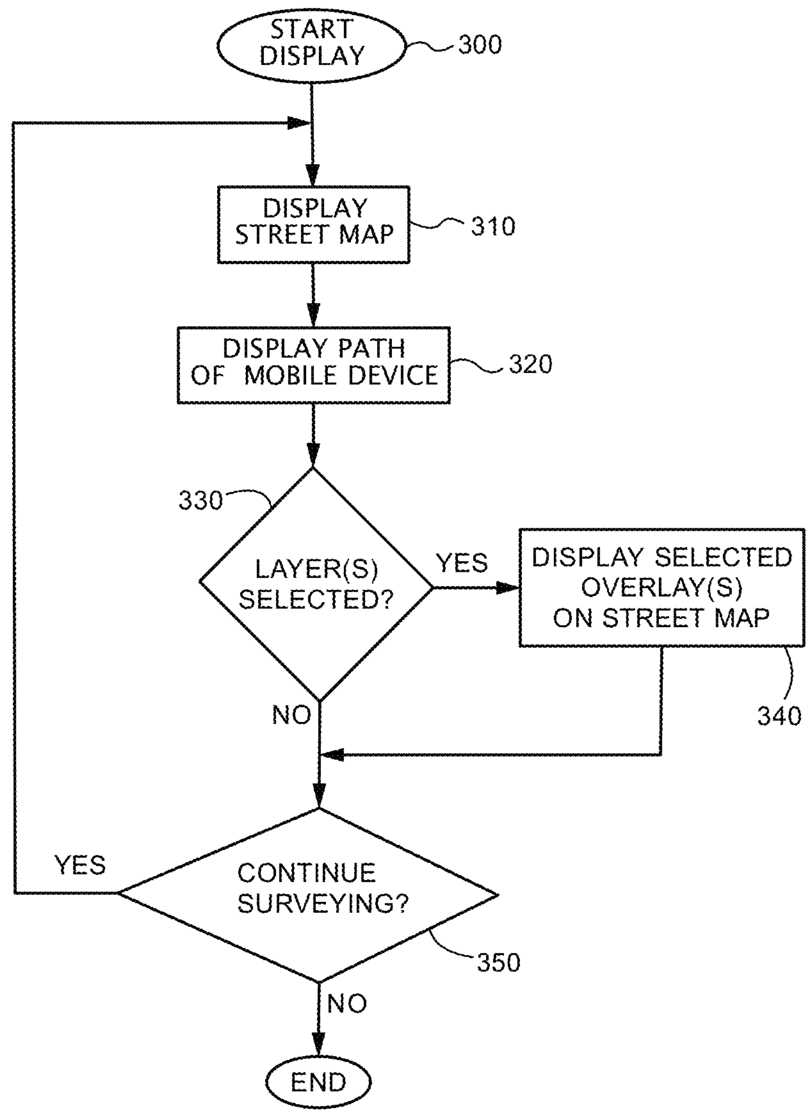
FIG. 15 is a flow chart showing steps for displaying layers overlaid or superimposed on a street map according to some embodiments of the present invention.

FIG. 15 is a flow chart showing steps for displaying layers overlaid or superimposed on a street map according to some embodiments of the present invention. In step 310, a street map is displayed, preferably on a GUI visible to the operator in the vehicle. In step 320, the path of the vehicle with the mobile gas measurement device is displayed on the map. Various elements displayed on the map are regarded as layers which may be turned on or off. In this example, the map controls window (FIG. 7) includes six user-selectable buttons named "Hide Peak Markers", "Hide Search Area Indicators", "Minimum Amplitude", "Hide Isotopic Analysis", "Hide Field of View", and "Hide Plat Outline". In decision step 330, it is determined if one or more of these layers is selected. If yes, the selected layer is displayed overlaid or superimposed on the street map in step 340. If not, it is determined if the survey is to continue. If yes, display steps 310-350 are repeated. If not, the display options may end.

The exemplary systems and methods described above allow a surveyor to locate potential gas leak sources efficiently and effectively in highly populated areas. The search area indicators provide likely direction and estimated maximum distance to the source of detected gas leaks, while the survey area indicators provide an estimated statistical measure of confidence that an area was successfully surveyed for potential gas leaks. These aspects provide significant improvement in finding gas leak sources over conventional methods where engineers scan the area very slowly and in all directions by trial and error to find the source of a gas leak. These aspects also account for wind that may quickly disperse a gas plume.

Figure 20:
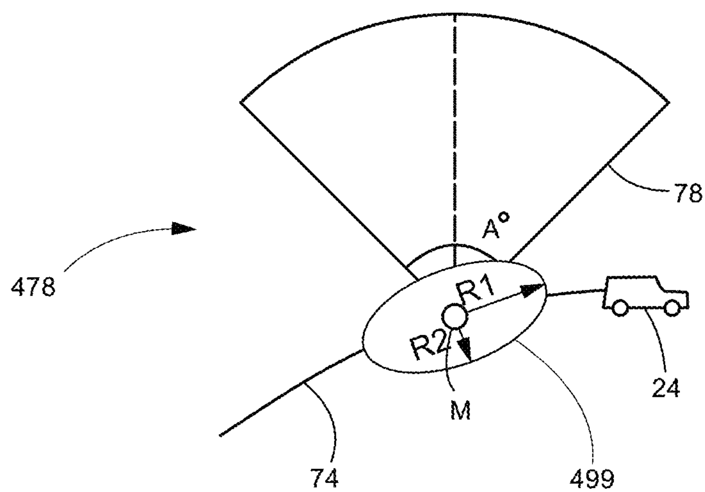
FIG. 20 shows an exemplary dual-zone search area indicator comprising an angular search area indicator and a positional uncertainty indicator according to some embodiments of the present invention.

Exemplary Systems and Methods Accounting for Uncertainties in Wind and/or Position Measurements In some embodiments, calculated uncertainties in wind and/or position measurements are taken into account in one or more of the steps described herein, in particular to generate search area indicators as illustrated in FIGS. 4 and 8, survey area indicators as illustrated in FIGS. 4 and 9, and/or dual-zone search area indicators as illustrated in FIG. 20, described below.

Wind Direction Uncertainty

Consider the exemplary search area indicator 78*c* shown in FIG. 8. As noted above, the search area indicator 78*c* may have the shape of a sector of a circle, with the center of the circle positioned on the map at the location of the gas concentration measurement point M3. The angle A subtended by the sector of the circle may be proportional to a standard deviation of the wind direction measurements taken at or nearby the measurement point M3. For example, the angle A may be set to a value that is twice or four times the angular standard deviation of the wind direction measurements.

Figure 19:
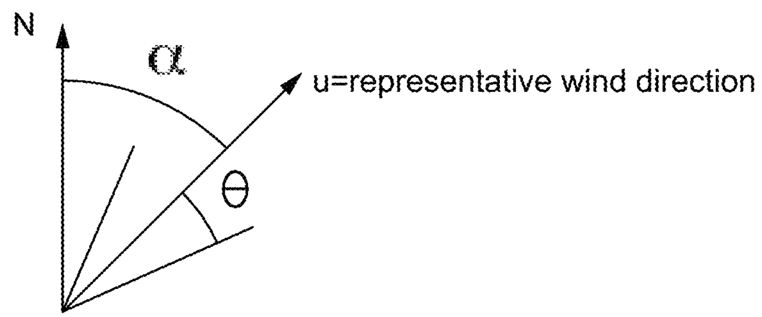
FIG. 19 illustrates an exemplary relationships between a reference (fixed) direction, a wind direction, and a wind direction variability and/or uncertainty indicator according to some embodiments of the present invention.

Consider now the exemplary configuration shown in FIG. 19, wherein N represents a reference direction (e.g. a North-South axis), and u is a representative wind direction. For example, u may be taken to the mean direction calculated over n samples, each characterized by an associated wind direction $u_1, u_2, \ldots, u_n$. The angle α represents the angle between the reference and representative wind directions, while the angle θ represents the angle between the representative wind direction and the search area indicator boundary, i.e. θ=A/2, or half the angular extent of a search area indicator.

In some embodiments, a calculation of the angle θ (or A) may take into account both a variability of wind direction measurements, as described above, and a determined uncertainty in measured wind direction with respect to ground. For measurements taken using a moving vehicle, the wind speed and direction with respect to the ground are calculated by removing the effect of the survey vehicle motion from the apparent wind speed and direction measured onboard the vehicle. Possible sources of uncertainty in the wind direction with respect to the ground include, for example: the instrumental error of the wind sensor, the instrumental error of the sensor or system used to measure the speed of the vehicle, and compression or other distortion of the air stream at the location where the wind measurement is made as the survey vehicle moves.

In some embodiments, a value of the angular extent θ is determined according to a relation:

$$\theta=\beta(\sigma_{variability}^2+\sigma_{uncertainty}^2)^{1/2} \quad (5)$$

wherein the variability term represents a variability (e.g. standard deviation or similar measure) of values relative to the mean, while the uncertainty term is a function of the magnitudes of the wind speed u and car speed v, for example $$\sigma_{variability} = \left(\frac{1}{N}\sum_{i=1}^{N}(\overline{\alpha}-\alpha_i)^2\right)^{1/2}, \quad (6A)$$

with $$\overline{\alpha} = \frac{1}{N}\sum_i \alpha_i$$

with representing the mean value of $\alpha_i$, and $$\sigma_{uncertainty}=f(u,v), \quad (6B)$$

for example $$\sigma_{uncertainty} = \min\left(180^\circ, a\frac{b+cv}{u+\varepsilon}\right), \quad (6C)$$

wherein $\alpha_i$ are measured wind directions each characterizing a sample, a, b, c, β and □ are parameter values, v represents a magnitude of a vehicle velocity vector, and u represents a magnitude of a wind direction vector.

In some embodiments, the overall scaling factor β has a value between 1 and 3, for example about 2. A larger overall scaling factor leads to the inclusion of a larger peripheral area in each search area indicator, while a smaller scaling factor leads to a narrower, more focused search area indicator.

The number N represents the number of samples used to generate a given search area indicator. In some embodiments, the number N has a fixed, peak-independent value. In some embodiments, the number N may depend on one or more determined characteristics of the peak, such as a spatial width of the peak and/or an estimate of a propagation distance (or time) for the plume. In general, the farther away a source is, the better a determined average wind direction and directional variability describes how good our knowledge of the true source direction is. Conversely, the closer the source, and the narrower the width of the peak in concentration, the more likely it is that an instantaneous wind direction indicates the direction to the source.

In some embodiments, a measurement uncertainty after averaging over n measurements may be determined as a function of the number of measurements, for example $$\sigma_{uncertainty} = \min\left(180^\circ, \frac{a}{\sqrt{n}}\sum_i \frac{b + cv_i}{u_i}\right), \tag{6D}$$

which reduces to eq. (6C) for n=1. In other embodiments, the term a in eq. (6C) may be dependent on n, for example by including a 1/sqrt(n) factor such as the one illustrated in eq. (6D).

Eq. (6D) illustrates embodiments in which a measurement uncertainty is calculated using a variable window, rather than a fixed window. In some embodiments, the averaging window may be chosen according to parameters such as peak width, wind speed, wind speed variability, wind direction variability, and car trajectory parameters such as parameters characterizing changes in direction. For example, a shorter averaging window may be used for narrower peaks, since narrower peaks are more likely to originate from nearby leaks, and in such cases an instantaneous wind direction may better constrain the direction of the leak than wind direction measurements taken at more distant time points. Additionally, when the wind direction is less variable, less averaging time may be needed to obtain a representative range of direction. Conversely, when the wind speed is low, the wind direction is likely to be more variable, and a longer averaging time may be useful. Parameters based on the trajectory of the car may be particularly useful in urban areas such as urban canyons, where the true wind direction may change abruptly after the survey vehicle turns onto a new street. In some embodiments, a shorter averaging window is used immediately after a sharp (e.g. more than 45 degrees, or 90 degrees) turn is made, since older wind measurement values are not representative of the instantaneous wind direction and/or speed.

In some embodiments, using a variable measurement window as described above may affect the determination of parameters other than measurement uncertainty. Such parameters may include a representative wind direction, a determined wind direction variability, and/or other parameters described above.

The minimum selection operation illustrated in eqs. (6C-D) may be used to constrain the angular uncertainty to a maximum angle of 180 degrees. Such an angle implies that no direction is more likely than any other, i.e. that the wind direction is considered to contain no useful information regarding the source location.

The parameters a, b, c, and ε may have empirically-determined values reflecting measurement uncertainties in a given experimental context. In exemplary embodiments, an overall uncertainty scaling factor a has a value between 0.5 and 1.5, a vehicle velocity added factor b has a value between 0 and 1, a vehicle velocity scaling factor c has a value between 1 and 5, and a wind velocity added factor ε has a value between 0.001 and 0.1. In one exemplary embodiment, a, b, c, and ε have values of about 0.33, 0, 2 and 0.01, respectively.

In some embodiments, a magnitude of the uncertainty in the reconstructed true wind direction due to multiple sources of measurement error, as well as its functional dependence on the speed of the vehicle and the true wind speed and direction with respect to the car's direction of travel, may be determined using a Monte-Carlo simulation as described below. In a single realization of the simulation, a particular combination of a true vehicle velocity and true wind velocity is chosen. The effects of instrumental uncertainty on the measurements of car velocity and apparent wind velocity may be simulated by introducing measurement errors, such as Gaussian errors, according to the known specifications of the measurement devices. The true wind speed and direction are then reconstructed from the simulated noisy measurements of vehicle velocity and apparent wind speed as described above. Multiple realizations of the measurement are simulated for each combination of true wind and vehicle velocity. The uncertainty in the reconstructed true wind direction for a particular combination of true car velocity and true wind velocity may be taken to be the standard deviation of the distribution of the reconstructed wind direction about the true direction, or another indicator of the variability of the distribution. After performing the simulation for multiple combinations of true car velocity and wind velocity, a functional form for the dependence of reconstructed direction on wind speed and car speed may be generated.

In an exemplary embodiment, a simulated measurement error was determined in the presence of two sources of error which were taken to be equal in magnitude: the measurement error due to the wind sensor, described above, and a measurement error due to compression of the air stream above the vehicle, as described below. Equation (6C) was found to be a good approximation of the functional dependence of the reconstructed true wind direction uncertainty for car speeds less than 20 m/s when the values 1, 0, 2, 0.01, were chosen for parameters a, b, c, and ε, respectively, for a single measurement, and 0.33-1/sqrt(10), 0, 2, 0.01 for 10 measurements, respectively.

In some embodiments, wind sensors that employ ultrasonic time-of-flight or phase shift techniques often quote specs for measurement errors that are proportional to the measured wind speed, with typical relative uncertainties of 2% or better. We have found that the uncertainty in the speed of the vehicle as determined using a series of timed location measurements made with a high-precision (sub-meter) GPS system is usually much smaller than the measurement error given by common wind sensor specifications. In addition, we have found that a correction to the component of apparent wind speed in the direction of motion by a simple multiplicative factor can reasonably account for the effect of the compression of the airstream by the profile of the vehicle, and that the precision with which one can measure the correction factor is typically better than 2%. When taken together, such sources of measurement error affect the uncertainty in the calculated true wind direction in a manner that increases approximately in proportion to car speed and inversely with wind speed, according to the form of eq. (6C).

Eq. (6C) may be better understood by considering FIG. 21, which shows an exemplary reconstructed mean wind bearing uncertainty (in degrees) after ten measurements as a function of vehicle speed (in m/s) for four different wind speed values, and for a, b, c, and ε values of 0.33, 0, 2 and 0.01, respectively, according to some embodiments of the present invention. As illustrated, the computed uncertainty increases with vehicle speed and decreases with wind velocity; the highest uncertainties correspond to high vehicle speeds and low wind velocities. For the sources of measurement error simulated here, we found that the reconstructed mean wind bearing uncertainty had a slight dependence on the angle between the true wind direction and the direction of the vehicle's motion, which could be safely disregarded.

Figures 21, 22:
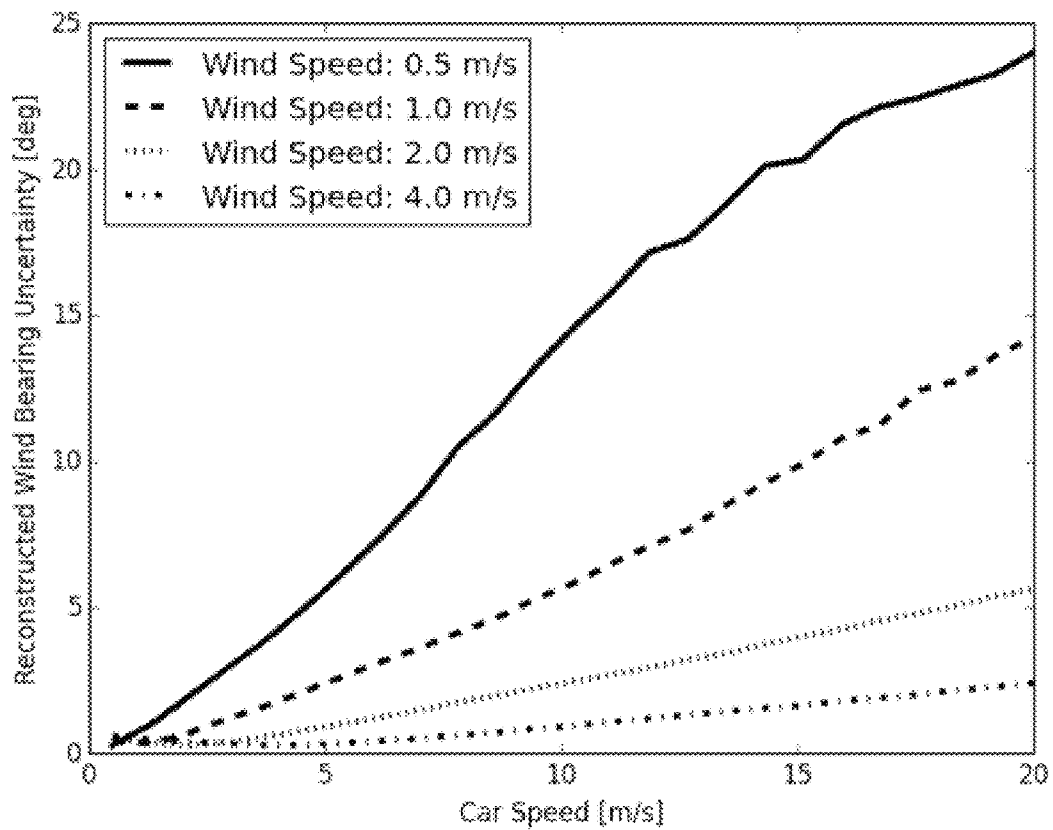
FIG. 21 illustrates an exemplary reconstructed wind bearing uncertainty as a function of vehicle speed for a fixed wind bearing and five different wind speed values according to some embodiments of the present invention.
FIG. 22 shows computed values of a number of parameters for three exemplary wind speeds according to some embodiments of the present invention.

FIG. 22 shows computed values of a number of parameters for three exemplary wind speeds according to some embodiments of the present invention. In particular, the derivative of uncertainty (eq. (6C)) with respect to wind speed, $d\sigma/dv$, is equal to ac/u, or approximately 2/u for the exemplary parameter values above. FIG. 22 illustrates how the results of a simulation (e.g. Monte-Carlo simulation) can be used to deduce or confirm a dependence of the uncertainty term on car speed and wind speed.

Figure 23:
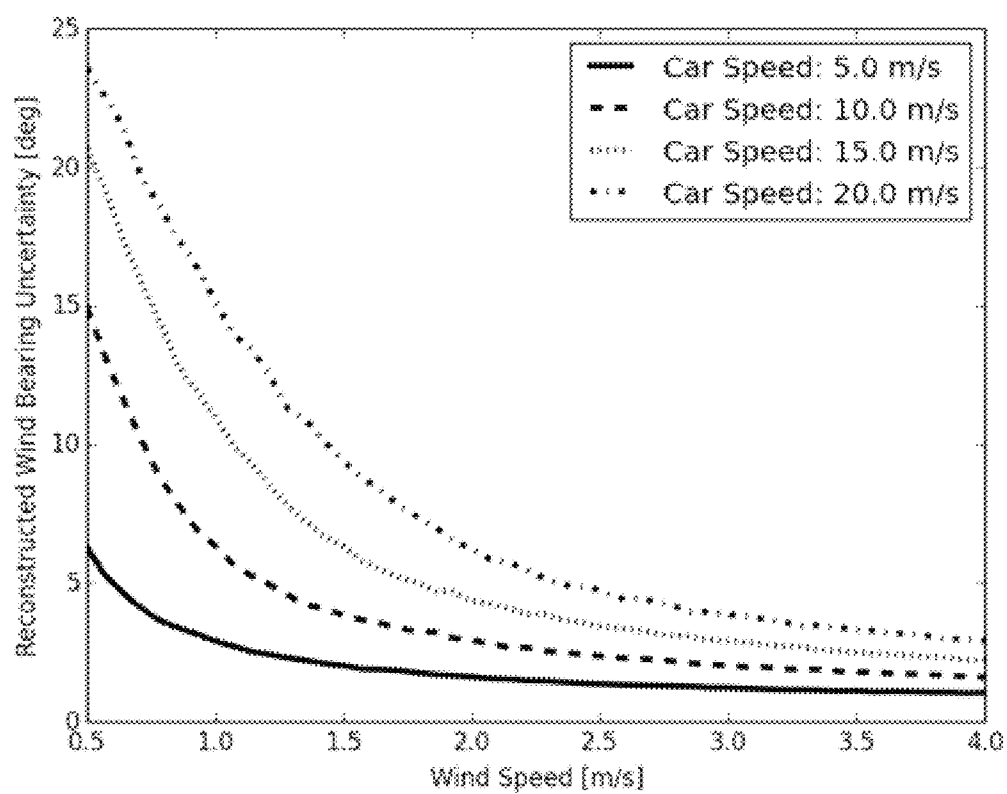
FIG. 23 shows an exemplary computed (simulated) pointing uncertainty and an associated analytical function as a function of wind speed for a vehicle speed of 10 m/s according to some embodiments of the present invention.

FIG. 23 shows an exemplary computed (simulated) pointing uncertainty (in degrees) after ten measurements, as a function of wind speed (in m/s) for four vehicle speeds, according to some embodiments of the present invention. It can be seen that the computed pointing uncertainty exhibits an inverse-dependence on wind speed as in equation 6C. We found that that the illustrated curves are sufficiently well described by equation 6C when the appropriate values of a, b, c and ε are chosen (0.33, 0, 2, and 0.01, respectively, for the curves of FIG. 23).

Local Potential Leak Source Area and Associated Peak Position Uncertainty

Figure 24:
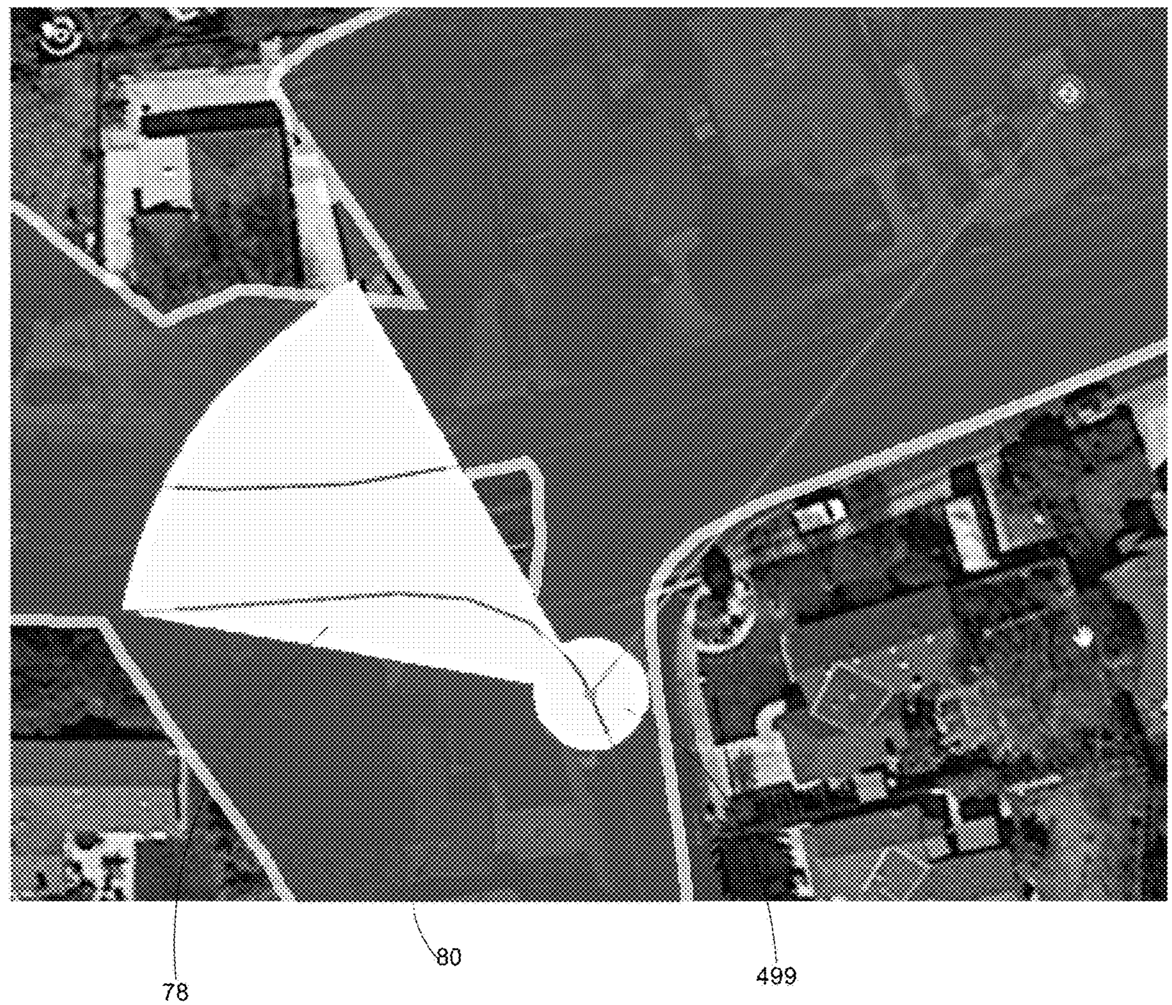
FIG. 24 shows an angular search area indicator and an associated positional uncertainty indicator, as well as a survey area indicator, all superimposed on a map display according to some embodiments of the present invention.

In some embodiments, a local potential leak source area is determined and represented graphically as described below. The local potential leak source area may represent an uncertainty in determined peak position and potentially other sources of uncertainty, as described below. FIG. 20 shows an exemplary dual-zone search area indicator 478 that includes an angular indicator 78 reflecting wind variability and/or measurement uncertainty as described above, and a local potential leak source area indicator 499 graphically representing a potential local leak source area situated around the gas concentration measurement point. In some embodiments, the area defined by local potential leak source area indicator 499 has a boundary within a predetermined distance (e.g. 10 meters) of the gas concentration measurement point. Local source area indicator 499 may reflect an uncertainty in the geospatially-referenced position determined to be associated with a peak event. Local source area indicator 499 may have a rounded shape, e.g. a circle or an ellipse centered at the determined event location. In some embodiments, a box (e.g. rectangular or square) or other sharp-angled shape may be used. Local source area indicator 499 reflects a probability of near- or under-vehicle leaks, some of which may be present downwind from a recorded vehicle location. FIG. 24 shows an angular indicator 78 and an associated local source area indicator 499, as well as a survey area indicator 80, all superimposed on a map display, according to some embodiments of the present invention.

The area covered by local source area indicator 499 represents graphically a physical, geospatially-referenced area where a potential leak source may be located. In some embodiments, the size and/or shape of local source area indicator 499 may be chosen according to one or more survey parameters, as described below. In some embodiments, local source area indicator 499 is formed by a circle or other symmetrical shape at vehicle speeds below a predetermined threshold, and by an ellipse or other elongated shape at vehicle speeds above the predetermined threshold. In other embodiments, local source area indicator 499 may have the same shape at all speeds, with the size of the shape fixed or speed-dependent. In some embodiments, local source area indicator 499 is a circle having a fixed radius corresponding to a 90% containment area for near or under-vehicle leaks. Such a containment area may be determined empirically, by comparing where confirmed locations of identified leaks are situated on a map relative to a recorded peak location. For example, local source area indicator 499 may have a radius between 10 and 30 feet, for example about 20 feet, for vehicle speeds below a threshold such as 30, 40, or 45 mph. For vehicle speeds above the threshold, and in particular above 45 mph, which are above those commonly used in leak surveys, local source area indicator 499 may be shaped as an ellipse, with the longer ellipse axis along the direction of motion reflecting the added positional uncertainty arising from imperfect synchronization between location and concentration measurements or other speed-dependent error source(s). For example, in some embodiments location and concentration measurements may be synchronized only to about 0.2-0.5 seconds, for example about 0.3 seconds, which corresponds to a significant positional uncertainty at high vehicle speeds. In some embodiments, local source area indicator 499 is centered at the location of an identified peak event; in some embodiments, local source area indicator 499 may be weighted toward the upwind direction, i.e. have a larger extent upwind and a lesser extent downwind from the associated peak location.

A measurement of concentration versus position involves the synthesis of data from two sources: a gas (e.g. methane) concentration analyzer, and a position determination system such as a GPS system. Both sub-systems measure their respective data with respect to time, and may have different reporting latencies, i.e. the time delays between the instant a measurement is made and the instant the measurement is reported a central computer or data acquisition system. The two measurements are synchronized in time in order to arrive at a result representing concentration as a function of geospatially-referenced position. Consequently, an uncertainty in the timing delay calibration between the two measurements will propagate as an uncertainty in the location where the peak concentration is detected.

In some embodiments, we found that a timing offset between concentration and position measurements can typically be found to a precision of 0.1 to 1 second. With a survey vehicle velocity of 5 to 10×s per second, such a time offset translates into an error in the position of the detected gas peak ranging from about 0.5 meters to about 10 meters. Such a situation results in the possibility that leaks that lay on the path of the survey vehicle may appear to fall outside of a purely-angular area search area indicator, by appearing on a map to be downwind (behind) the peak concentration location as well as behind the angular search area wind indicator.

Furthermore, because of the finite accuracy of position measurement (GPS) systems, peak locations may tend to fall to the right or the left of the track of the survey vehicle by a distance reflecting the accuracy of the location measurement. In some embodiments, the position measurements can be made with an accuracy of about 1 meter or better. In addition, in some embodiments it was also found that, depending on the strength of the wind (especially in light-wind situations), leaks may be detected from distances of up to several meters downwind of the survey track, which can lead to a similar case as where the wind indicator alone does not cover the leak location. This downwind distance depends on the magnitude of the mean wind relative to the turbulent wind components, which are driven by the stability of the atmosphere and/or nearby structures or terrain features. For example, this downwind distance is largest under light wind conditions when the atmosphere is unstable, and is smallest when the mean wind is large and the atmosphere is stable. Within this distance, the gas from the leak can be detected in all directions regardless of the mean wind. Outside of this distance, the mean wind dominates the transport and leaks in the downwind directions can no longer be detected at the measurement point. Under typical conditions, this distance ranges from less than a meter to several meters or more.

In addition, when depicting the location of the peak detection on a map or satellite image, another source of uncertainty arises from how well certain features or geo-referenced points in the image can be mapped to actual geographical coordinates. In one embodiment, we found that the magnitude of this error can be up to several meters, and can be the dominant source of error in the depiction of the measured peak detection position.

Such uncertainty in position may be addressed by considering a search area to include, in addition to angular wind direction indicator 78 (FIG. 20), a local source area indicator 499 centered at the peak detection position. In some embodiments, local source area indicator 499 may be shaped as an ellipse. In the following discussion, a circle may be considered to be a special case of an ellipse, i.e. an ellipse with equal axes. In some embodiments, one axis of the ellipse ($R_1$) is aligned with the instantaneous direction of motion of the survey vehicle at the location where the peak concentration is detected. The length of each axis of the ellipse may be chosen to be fixed or variable in a way that is suitable to account for one or more of the effects that lead to uncertainty in the detected peak gas location and/or uncertainty in leak location for near-vehicle leaks.

In some embodiments, the length of the axis of the ellipse that is aligned with the direction of motion ($R_1$) is scaled in proportion to the speed of the vehicle. A fixed timing-delay offset between the concentration and location measurements results in a positional error that scales directly with car speed. Consequently, scaling the ellipse axis with the vehicle speed reflects an expected positional uncertainty due to timing delay errors.

In some embodiments, the axis of the ellipse that is perpendicular to the direction of motion ($R_2$) is scaled according to data representative of wind speed, wind direction variability, and/or atmospheric stability. Such scaling reflects the observation that the distance at which upwind leaks may be detected can depend on the local wind speed as well as on the degree of atmospheric stability. If a fixed length is chosen for the axis perpendicular to the direction of vehicle motion, the length may be chosen to ensure that near-vehicle leaks fall within ellipse with a chosen frequency (probability) under typical survey conditions. In such case, a suitable value for $R_2$ may be chosen to be between about 1 and 10 meters, more particularly between about 3 and 8 meters, for example about 6 meters. In some embodiments an appropriate length may be chosen by driving multiple times upwind of a source at various distances, repeating the process for multiple sources, and constructing an appropriate probability distribution.

Scaling the minor and/or major axes is a way to account for how the likelihood of detecting the plume from a position upwind of the source changes as a function of the wind speed, variability of the wind direction, or atmospheric stability conditions. The lighter the wind and more variable the direction, the more likely it would be to detect the source from a position upwind with respect to the mean wind direction. Additionally, the likelihood of detecting the source from an upwind position may be a function of the degree of atmospheric stability. The more unstable the atmosphere (closer to stability class A), the more likely the plume dispersion is dominated by vertical mixing (as opposed to horizontal mixing) and the less likely it would be to detect the source from a position upwind of the source. In some embodiments, such scaling relationships may be determined empirically through systematic measurements.

In some embodiments, it may be desirable to require minimum values for the lengths of both axes, to ensure the ellipse does not collapse into a line or point. In an exemplary embodiment, the minimum length of each axis may have a value between 6 and 16 meters, for example about 12 meters (corresponding to a radius of 6 m in the case of a circle). In some embodiments it may be desirable to set an upper limit on the eccentricity of the ellipse, for example for visualization/aesthetic purposes. In an exemplary embodiment, the ratio of the lengths of the semimajor and semiminor axes may be limited to values between 1 and 4, with a preferred value of 2.

Survey Area Boundary Adjustments According to Wind and/or Position Uncertainties In some embodiments, the determination of a boundary of a survey area 80 as described above with reference to FIGS. 9-11 may take into account determined uncertainties in wind direction and measurement location determinations. The effect of including the measurement uncertainty on the probability density in FIG. 11 is to make the probability density distribution wider, such that a larger range of angles between theta min and theta max would be needed to fulfill the probability condition. If one maintains the same probability threshold as described above, the net effect is a reduction in the width of the field of view (FOV).

Figure 25:
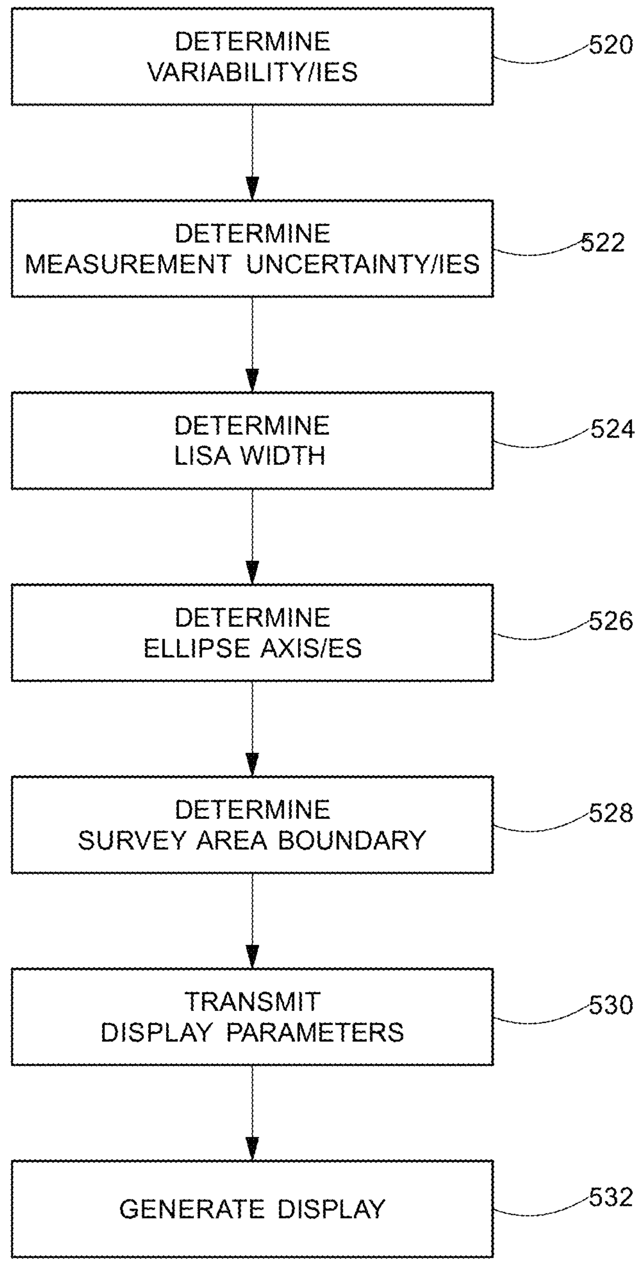
FIG. 25 shows an exemplary sequence of steps performed by at least one processor to generate a display according to determined variability and measurement uncertainty indicators, according to some embodiments of the present invention.

FIG. 25 shows an exemplary sequence of steps performed by at least one processor to generate a display according to determined variability and/or measurement uncertainty indicators, according to some embodiments of the present invention. In a step 520, one or more parameter variability indicators are determined as described above. In a step 522, one or more measurement uncertainty indicators are determined as described above. In a step 524, a width is determined for each search area indicator according to the determined variability and/or measurement uncertainty indicators as described above. In a step 526, the length(s) of one or both central LISA ellipse axes are determined according to the determined variability and/or measurement uncertainty indicators as described above. In a step 528, a survey area boundary is determined according to the determined variability and/or measurement uncertainty indicators as described above. In a step 530, determined display parameters are transmitted to a display device for display. In a step 532, the display device renders a display as shown above according to the received display parameters.

In some embodiments, the steps shown in FIG. 25 other than the final step 532 are performed on a cloud server or other device remotely connected to a display device present in a survey vehicle or other on-site location, while step 532 is performed on a local or remote display device. In some embodiments, at least parts of some of the steps prior to step 532 may also be performed locally, for example using a scripting language such as Javascript. In cases where there is no connection to the cloud (due to poor cell coverage, for example) the survey can still be conducted and the results still seen by the user in real time.

It will be clear to one skilled in the art that the above embodiments may be altered in many ways without departing from the scope of the invention. For example, gas leaks may include, but are not limited to: leaks from gas pipes or transportation systems (e.g., natural gas leaks), leaks from gas processing or handling facilities, and emissions from gas sources into the environment (e.g., pollution, gas emission from landfills, etc.). Gas concentration measurements are preferably performed rapidly (e.g., at a rate of 0.2 Hz or greater, more preferably 1 Hz or greater). This enables the concept of driving a vehicle at normal surface street speeds (e.g., 35 miles per hour) while accumulating useful gas concentration and wind measurement data. However, embodiments of the invention do not depend critically on the gas detection technology employed. Any gas concentration measurement technique capable of providing gas concentration measurements can be employed in some embodiments.

Although the gas concentration measurements are preferably performed while the gas measurement device is moving, at least some gas concentration measurements can be performed while the gas concentration measurement device is stationary. Such stationary gas concentration measurements may be useful for checking background gas concentrations, for example. While real-time measurements are preferred, post analysis of more sparsely sampled data, e.g., via vacuum flask sampling and later analysis via gas chromatography or other methods, may be used in some embodiments. Optionally, measurements can be made on different sides of the road or in different lanes to provide more precise localization of the leak source. Optionally, the present approaches can be used in conjunction with other conventional methods, such as visual inspection and/or measurements with handheld meters to detect emitted constituents, to further refine the results. Optionally, measurements can be made at reduced speed, or with the vehicle parked near the source, to provide additional information on location and/or source attribution.

Optionally, the system can include a source of atmospheric meteorological information, especially wind direction, but also wind speed or atmospheric stability conditions, either on-board the vehicle or at a nearby location. The stability of the atmospheric conditions can be estimated simply from the wind speed, the time of day, and the degree of cloudiness, all of which are parameters that are available either on the vehicle or from public weather databases. Optionally, the apparatus can include an on-board video camera and logging system that can be used to reject potential sources on the basis of the local imagery collected along with the gas concentration and wind data. For example, a measured emissions spike could be discounted if a vehicle powered by natural gas passed nearby during the measurements. Optionally, repeated measurements of a single location can be made to provide further confirmation (or rejection) of potential leaks. Accordingly, the scope of the invention should be determined by the following claims and their legal equivalents.

What is claimed is:

1. A natural gas leak detection system comprising:

at least one hardware processor and associated memory configured to generate display content according to gas concentration and associated wind direction and wind magnitude data characterizing a gas concentration measurement run performed by a mobile gas measurement device; and a display device coupled to the at least one hardware processor and associated memory, the display device configured to present the display content;

wherein generating the display content comprises identifying at least one angular search area suspected to have a natural gas leak source, the search area having an axis indicating a representative wind direction relative to a geo-referenced location of a gas concentration measurement point, and the search area having a width relative to the axis, wherein the width is indicative of a wind direction variability characterizing a plurality of wind direction measurements in an area of the gas concentration measurement point;

identifying a local potential leak source area, the local potential leak source area representing a potential local leak source area centered at the gas concentration measurement point and extending within no more than 10 meters of the gas concentration measurement point; and graphically highlighting a part of a display of a street map selectively within the identified angular search area and local potential leak source area.

2. The system of claim 1, wherein the potential local leak source area comprises an area downwind from the gas concentration measurement point.

3. The system of claim 1, wherein the local potential leak source area is identified according to a survey vehicle speed characterizing the gas concentration measurement point.

4. The system of claim 3, wherein the local potential leak source area is identified according to a wind speed characterizing the gas concentration measurement point.

5. The system of claim 4, wherein the local potential leak source area is identified according to a survey vehicle direction characterizing the gas concentration measurement point.

6. The system of claim 5, wherein the local potential leak source is identified according to a wind direction characterizing the gas concentration measurement point.

7. The system of claim 1, wherein the local potential leak source area is a closed area having a rounded boundary.

8. The system of claim 1, wherein the local potential leak source area is shaped as a circle.

9. The system of claim 8, wherein the circle has a radius representing a geographical distance between 10 and 30 feet.

10. The system of claim 9, wherein the radius represents a geographical distance between 15 and 25 feet.

11. The system of claim 1, wherein the local potential leak source area indicator has a shape elongated along a measurement path at the geo-referenced location of the gas concentration measurement point.

12. The system of claim 1, wherein the local potential leak source area is shaped as an ellipse.

13. The system of claim 12, wherein a major axis of the ellipse is tangential to a measurement path at the geo-referenced location of the gas concentration measurement point.

14. The system of claim 13, wherein a length of the major axis of the ellipse is representative of an uncertainty in the determination of the geo-referenced location along a tangent to the measurement path at the geo-referenced location of the gas concentration measurement point.

15. The system of claim 13, wherein a length of the major axis of the ellipse is determined such that an estimated frequency at which near- or under-vehicle leak locations fall inside a boundary of the ellipse satisfies a probability condition.

16. The system of claim 13, wherein a length of the major axis of the ellipse is determined according to a survey vehicle speed characterizing the gas concentration measurement point.

17. The system of claim 13, wherein a length of the minor axis of the ellipse is determined according to a wind speed characterizing the gas concentration measurement point.

18. The system of claim 13, wherein a length of the minor axis of the ellipse is determined according to data representative of local atmospheric stability at the gas concentration measurement point.

19. The system of claim 13, wherein a length of a minor axis of the ellipse is determined according to an uncertainty in the determination of the geo-referenced location along a direction perpendicular to the measurement path at the geo-referenced location of the gas concentration measurement point.

20. The system of claim 13, wherein a length of a minor axis of the ellipse is determined according to a characteristic distance from which upwind leaks near the measurement path are detectable.

21. The system of claim 13, wherein a length of the minor axis of the ellipse is determined such that an estimated frequency at which near- or under-vehicle leak locations fall inside a boundary of the ellipse satisfies a probability condition.

22. The system of claim 1, wherein the width of the search area indicator is determined according to a survey vehicle speed and a wind speed characterizing the gas concentration measurement point.

23. The system of claim 22, wherein the width of the search area indicator is determined according to a function that increases with the survey vehicle speed characterizing the least one gas concentration measurement point, and decreases with the wind speed characterizing the gas concentration measurement point.

24. The system of claim 1, wherein the width of the search area indicator is determined according to an angular standard deviation characterizing the plurality of wind direction measurements.

25. The system of claim 1, wherein the display content further comprises:

at least one path on the map indicating a route of travel by the mobile gas measurement device, and at least one indicator on the map that indicates a surveyed area for at least one potential gas leak source, wherein the surveyed area adjoins the path and extends in a substantially upwind direction from the path, wherein the surveyed area is determined according to:

a wind direction variability characterizing a plurality of wind direction measurements performed along the route of travel; and a measurement uncertainty characterizing a plurality of wind directions relative to ground determined from the plurality of wind direction measurements.

26. A non-transitory computer-readable medium encoding instructions which, when executed by at least one hardware processor and associated memory, cause the at least one hardware processor and associated memory to generate display content for presentation on a display device, the display content being generated according to gas concentration and associated wind direction and wind magnitude data characterizing a gas concentration measurement run performed by a mobile gas concentration measurement device, wherein generating the display content comprises:

identifying at least one angular search area suspected to have a natural gas leak source, the search area having an axis indicating a representative wind direction relative to a geo-referenced location of a gas concentration measurement point, and the search area having a width relative to the axis, wherein the width is indicative of a wind direction variability characterizing a plurality of wind direction measurements in an area of the gas concentration measurement point; and identifying a local potential leak source area, the local potential leak source area representing a potential local leak source area centered at the gas concentration measurement point and extending within no more than 10 meters of the gas concentration measurement point; and graphically highlighting a part of a display of a street map selectively within the identified angular search area and local potential leak source area.

27. A system comprising at least one hardware processor and associated memory configured to generate display content for presentation on a display device, the display content being generated according to gas concentration and associated wind direction and wind magnitude data characterizing a gas concentration measurement run performed by a mobile gas concentration measurement device, wherein generating the display content comprises:

identifying at least one angular search area suspected to have a natural gas leak source, the search area indicator having an axis indicating a representative wind direction relative to a geo-referenced location of a gas concentration measurement point, and the search area having a width relative to the axis, wherein the width is indicative of a wind direction variability characterizing a plurality of wind direction measurements in an area of the gas concentration measurement point; and identifying a local potential leak source area, the local potential leak source area representing a potential local leak source area centered at the gas concentration measurement point and extending within no more than 10 meters of the gas concentration measurement point; and graphically highlighting a part of a display of a street map selectively within the identified angular search area and local potential leak source area.

* * * * *